United States Patent
Behr et al.

(10) Patent No.: US 10,909,397 B2
(45) Date of Patent: Feb. 2, 2021

(54) AIRCRAFT SUITE INCLUDING MAIN CABIN COMPARTMENT AND LOWER LOBE REST COMPARTMENT

(71) Applicant: Rockwell Collins, Inc., Cedar Rapids, IA (US)

(72) Inventors: Nicolas Behr, Kirkland, WA (US); R. Klaus Brauer, Seattle, WA (US); Trevor Skelly, Mercer Island, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/127,109

(22) Filed: Sep. 10, 2018

(65) Prior Publication Data

US 2020/0184242 A1 Jun. 11, 2020

Related U.S. Application Data

(63) Continuation-in-part of application No. 15/993,310, filed on May 30, 2018, now Pat. No. 10,452,934, (Continued)

(51) Int. Cl.
*B64D 11/00* (2006.01)
*G06K 9/00* (2006.01)
(Continued)

(52) U.S. Cl.
CPC ...... *G06K 9/00845* (2013.01); *B64D 11/0015* (2013.01); *G02B 1/11* (2013.01);
(Continued)

(58) Field of Classification Search
CPC ............ B64D 11/00; B64D 2011/0076; B64D 2011/0046; B64D 11/003; B64D 2011/0069; B64D 2011/0084
See application file for complete search history.

(56) References Cited

U.S. PATENT DOCUMENTS 2,455,157 A 11/1948 Bigelow
3,044,419 A 7/1962 Majnoni
(Continued)

FOREIGN PATENT DOCUMENTS

WO 2019207211 A1 10/2019

OTHER PUBLICATIONS

International Search Report and Written Opinion dated Dec. 18, 2019 for PCT/US2019/050387.
(Continued)

*Primary Examiner* — Richard G Davis
(74) *Attorney, Agent, or Firm* — Suiter Swantz pc llo

(57) ABSTRACT

An aircraft suite may include a passenger compartment disposed on a main deck of an aircraft. The passenger compartment may be partitioned from a main passenger cabin of the main deck by at least one bulkhead. The passenger compartment may include an aircraft seat and a hatch set within an opening in a floor of the passenger compartment. The aircraft suite may include a lower lobe rest compartment integrated in a cargo deck below the main deck. The lower lobe rest compartment may be proximate to the passenger compartment. The lower lobe rest compartment may include a passenger rest compartment and a device proximate to the hatch. The device may be configured to assist a passenger to at least one of descend into the lower lobe rest compartment from the passenger compartment, or ascend into the passenger compartment from the lower lobe rest compartment, via the hatch.

11 Claims, 23 Drawing Sheets

Related U.S. Application Data which is a continuation of application No. 15/382,633, filed on Dec. 17, 2016, now Pat. No. 10,089,544, which is a continuation-in-part of application No. 14/645,526, filed on Mar. 12, 2015, now Pat. No. 9,996,754, application No. 15/993,310, which is a continuation-in-part of application No. 14/645,526, filed on Mar. 12, 2015, now Pat. No. 9,996,754.

(60) Provisional application No. 62/729,237, filed on Sep. 10, 2018, provisional application No. 62/011,886, filed on Jun. 13, 2014.

(51) Int. Cl.
| | |
|---|---|
| G02B 1/11 | (2015.01) |
| G06F 3/00 | (2006.01) |
| G06F 3/01 | (2006.01) |
| G06F 3/14 | (2006.01) |
| H04N 5/225 | (2006.01) |
| H04N 5/232 | (2006.01) |
| H04N 7/18 | (2006.01) |
| G02B 27/00 | (2006.01) |

(52) U.S. Cl.
CPC .............. *G06F 3/005* (2013.01); *G06F 3/013* (2013.01); *G06F 3/1446* (2013.01); *G06K 9/00604* (2013.01); *G06K 9/00791* (2013.01); *H04N 5/2253* (2013.01); *H04N 5/23219* (2013.01); *H04N 5/23293* (2013.01); *H04N 5/23296* (2013.01); *H04N 7/181* (2013.01); *B64D 2011/0061* (2013.01); *G02B 27/0006* (2013.01)

(56) References Cited

U.S. PATENT DOCUMENTS

| | | | |
|---|---|---|---|
| 3,144,224 A | 8/1964 | Carroll | |
| 5,496,000 A | 3/1996 | Mueller | |
| 5,651,733 A | 7/1997 | Schumacher | |
| 5,784,836 A * | 7/1998 | Ehrick | B64D 11/00 244/118.5 |
| 6,003,813 A | 12/1999 | Wentland et al. | |
| 6,073,883 A | 6/2000 | Ohlmann et al. | |
| 6,152,400 A * | 11/2000 | Sankrithi | B64D 11/00 105/315 |
| 6,182,926 B1 * | 2/2001 | Moore | B64D 11/00 244/118.5 |
| 6,305,645 B1 | 10/2001 | Moore | |
| 6,393,343 B1 | 5/2002 | Frey et al. | |
| 6,464,169 B1 | 10/2002 | Johnson et al. | |
| 6,520,451 B1 | 2/2003 | Moore | |
| 6,616,098 B2 | 9/2003 | Mills | |
| 6,659,225 B2 | 12/2003 | Oliges et al. | |
| 6,772,977 B2 | 8/2004 | Dees et al. | |
| 6,808,142 B2 | 10/2004 | Oki | |
| 6,848,654 B1 | 2/2005 | Mills et al. | |
| 6,932,298 B1 | 8/2005 | Mills | |
| 6,986,485 B2 | 1/2006 | Farnsworth | |
| 7,088,310 B2 | 8/2006 | Sanford | |
| 7,156,344 B1 | 1/2007 | Guering | |
| 7,290,735 B2 | 11/2007 | Saint-Jalmes et al. | |
| 7,354,018 B2 * | 4/2008 | Saint-Jalmes | B64D 11/00 105/315 |
| 7,389,959 B2 | 6/2008 | Mills | |
| 7,762,496 B2 | 7/2010 | Seiersen et al. | |
| 7,823,831 B2 | 11/2010 | Guering | |
| 7,942,367 B2 | 5/2011 | Saint-Jalmes et al. | |
| 8,152,102 B2 * | 4/2012 | Warner | B64D 11/00 244/118.2 |
| 8,162,258 B2 | 4/2012 | Joannis et al. | |
| 8,328,137 B2 | 12/2012 | Sutthoff et al. | |
| 8,534,602 B2 | 9/2013 | Jakubec et al. | |
| 8,602,354 B2 | 12/2013 | Sutthoff et al. | |
| 8,727,277 B2 | 5/2014 | Guering et al. | |
| 8,794,569 B1 | 8/2014 | Barrou et al. | |
| 8,844,865 B2 | 9/2014 | Gehm et al. | |
| 8,881,524 B2 | 11/2014 | Andres et al. | |
| 8,905,633 B2 | 12/2014 | Popp et al. | |
| 8,991,756 B2 | 3/2015 | Papke | |
| 9,169,021 B2 | 10/2015 | Pozzi et al. | |
| 9,340,294 B1 | 5/2016 | Keleher et al. | |
| 9,403,465 B2 | 8/2016 | Kircher et al. | |
| 9,456,184 B2 | 9/2016 | Barrou et al. | |
| 9,545,998 B2 | 1/2017 | Lin | |
| 9,550,571 B1 | 1/2017 | Ohlmann et al. | |
| 9,706,242 B2 | 7/2017 | Dame et al. | |
| 9,708,065 B2 | 7/2017 | Sankrithi et al. | |
| 2005/0057344 A1 | 3/2005 | Davis et al. | |
| 2005/0178909 A1 * | 8/2005 | Mills | B64D 11/00 244/118.6 |
| 2006/0235753 A1 | 10/2006 | Kameyama | |
| 2007/0034212 A1 | 2/2007 | Bendley et al. | |
| 2007/0125909 A1 * | 6/2007 | Seiersen | B64D 11/00 244/118.5 |
| 2010/0140402 A1 * | 6/2010 | Jakubec | B64D 11/00 244/118.6 |
| 2010/0301163 A1 | 12/2010 | Guering et al. | |
| 2011/0139930 A1 * | 6/2011 | Sutthoff | B64D 11/02 244/118.5 |
| 2011/0253005 A1 | 10/2011 | Sun et al. | |
| 2013/0120162 A1 | 5/2013 | Stehman et al. | |
| 2013/0257688 A1 | 10/2013 | Yamazaki et al. | |
| 2014/0222119 A1 | 8/2014 | Pederson et al. | |
| 2014/0298582 A1 * | 10/2014 | Kircher | B60N 3/008 5/9.1 |
| 2015/0048205 A1 | 2/2015 | Seibt et al. | |
| 2015/0266658 A1 | 9/2015 | Tajima | |
| 2015/0358574 A1 | 12/2015 | Henion et al. | |
| 2017/0057637 A1 * | 3/2017 | Cole | B64D 11/00 |
| 2017/0094166 A1 | 3/2017 | Riedel | |
| 2017/0094167 A1 | 3/2017 | Riedel | |
| 2017/0137109 A1 * | 5/2017 | Sieben | B64C 1/18 |
| 2017/0233058 A1 | 8/2017 | Brunaux et al. | |
| 2018/0056846 A1 | 3/2018 | Nasiri | |
| 2018/0265201 A1 | 9/2018 | Carlioz et al. | |

OTHER PUBLICATIONS

International Search Report and Written Opinion dated Mar. 24, 2020 for PCT/US2019/050343.
International Search Report and Written Opinion dated Dec. 27, 2019 for PCT/US2019/050357.
International Search Report and Written Opinion dated Jan. 17, 2020 for PCT/US2019/050367.
International Search Report and Written Opinion dated Mar. 23, 2020 for PCT/US2019/050337.
International Search Report and Written Opinion dated Dec. 13, 2019 for PCTUS2019/050347.
Meyer, David, "Airbus Has a Solution to 17-Hour Flight Hell: Beds in the Cargo Hold", Fortune, Apr. 11, 2018, 2 pages, http://fortune.com/2018/04/11/airbus-zodiac-sleep-cargo-hold/.
Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity seat.
U.S. Department of Transportation Federal Aviation Administration, Advisory Circular, "Flightcrew Member Rest Facilities", Sep. 19, 2012, AFS-220, AC 117-1, 9 pages.
Flynn, David, Dec. 27, 2013, https://www.ausbt.com.au/the-best-seats-on-a-cathay-pacific-boeing-777-300er-try-the-upstairs-bunk-beds, 1 page.
Bahrami, Ali, Federal Register, vol. 68, No. 74, Apr. 17, 2003, Rules and Regulations, "Overhead Crew Rest Compartments", pp. 18843-18852.

(56) References Cited

OTHER PUBLICATIONS

Bahrami, Ali, Federal Register, vol. 77, No. 62, Mar. 30, 2012, Proposed Rules, "Crew Rest Compartments", pp. 19148-19153.

* cited by examiner

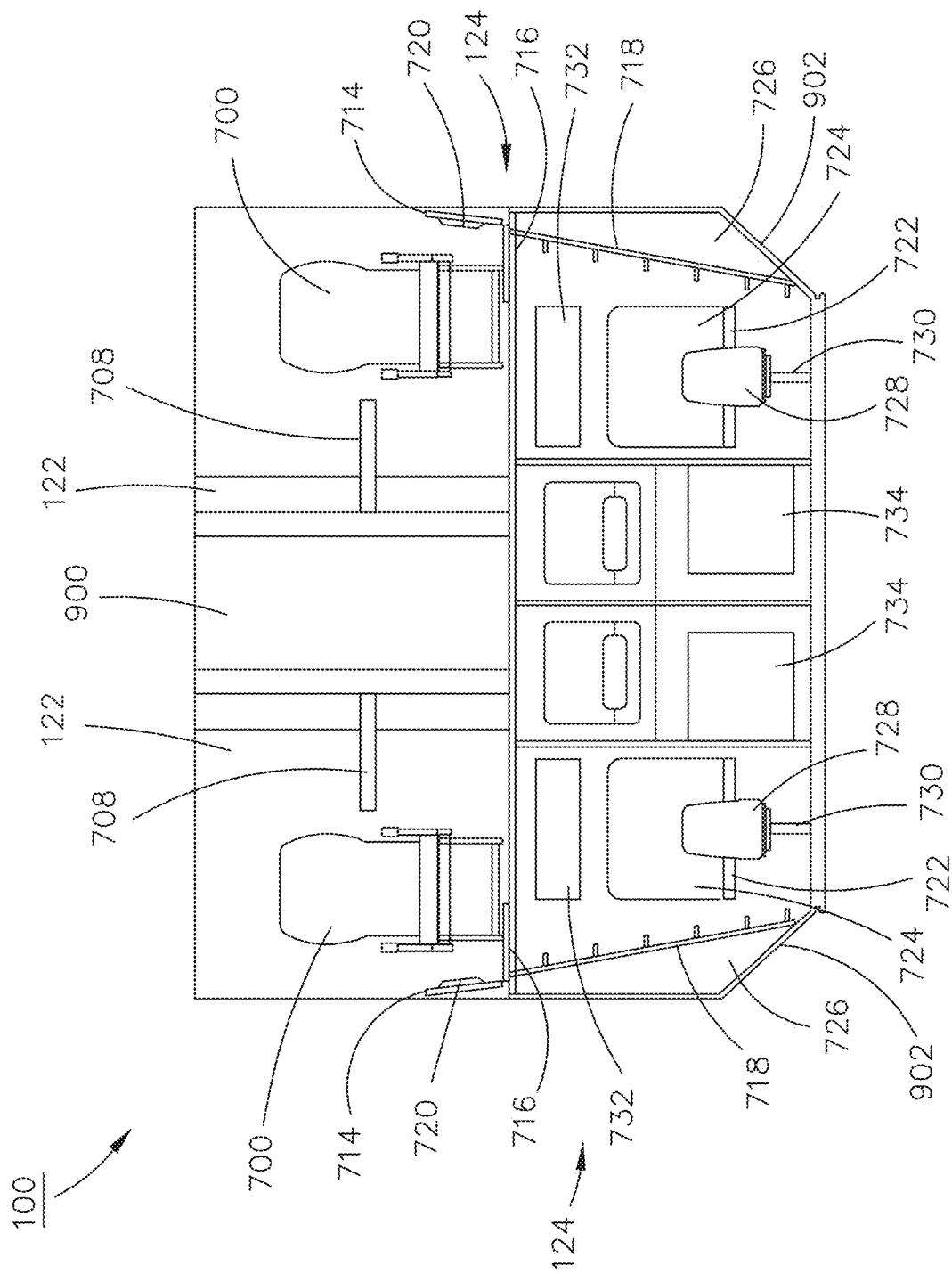

AIRCRAFT SUITE INCLUDING MAIN CABIN COMPARTMENT AND LOWER LOBE REST COMPARTMENT

CROSS REFERENCE TO RELATED APPLICATIONS

This application claims the benefit under 35 U.S.C. §§ 119 and/or 120 of:
(1) U.S. Provisional Patent Application Ser. No. 62/729,237, filed Sep. 10, 2018;
(2) U.S. patent application Ser. No. 16/127,035, filed Sep. 10, 2018;
(3) U.S. patent application Ser. No. 16/126,952, filed Sep. 10, 2018;
(4) U.S. patent application Ser. No. 16/127,074, filed Sep. 10, 2018;
(5) U.S. patent application Ser. No. 16/126,981, filed Sep. 10, 2018;
(6) U.S. patent application Ser. No. 16/127,088, filed Sep. 10, 2018;
(7) U.S. patent application Ser. No. 16/126,910, filed Sep. 10, 2018;
(8) U.S. patent application Ser. No. 16/127,119, filed Sep. 10, 2018; and
(9) U.S. patent application Ser. No. 15/993,310, filed May 30, 2018, which claims the benefit of:
   a. U.S. application Ser. No. 15/382,633 entitled "Apparatus and Method for Providing Attitude Reference for Vehicle Passengers" and filed Dec. 17, 2016, which claims priority to U.S. application Ser. No. 14/645,526 issued as U.S. Pat. No. 9,996,754 entitled "Apparatus and Method for Providing Attitude Reference for Vehicle Passengers" and filed Mar. 12, 2015, which claims priority to U.S. Provisional Application No. 62/011,866 filed on Jun. 13, 2014; and
   b. U.S. application Ser. No. 14/645,526 issued as U.S. Pat. No. 9,996,754 entitled "Apparatus and Method for Providing Attitude Reference for Vehicle Passengers" and filed Mar. 12, 2015, which claims priority to U.S. Provisional Application No. 62/011,866 filed on Jun. 13, 2014;
the contents of each of which are herein incorporated by reference in the entirety.

BACKGROUND OF THE INVENTION

Select passenger aircraft have incorporated onboard crew rest compartments (CRC) for the short-term use by pilots or crew. CRCs may include lounge chairs or, more commonly, bunks allowing cabin crew to rest in a lie-flat position when not on duty (e.g., on transoceanic or other long-haul flights requiring multiple shifts). However, CRCs are generally inaccessible to passengers for security reasons, and may be directly accessible from the cockpit only.

In addition, select passenger aircraft include premium areas in the main cabin (e.g., business-class areas or first-class areas) that include partitioned areas and/or premium enclosed compartments. The premium areas may include amenities such as, but not limited to, adjustable (e.g., reclining or lie-flat convertible seats), in-flight entertainment (IFE) devices, and/or passenger trays that can be used when passengers want to eat, drink, read, write, use portable devices (e.g., laptops, tablets, etc.). However, during very long travel (e.g., transoceanic or other long-haul flights), a passenger may prefer access to a passenger rest compartment (e.g., a bunk or berth) that includes a bed for the passenger to lay down and/or sleep.

As such, airlines may wish to provide passengers (e.g., those passengers occupying the premium areas in the main cabin) with access to bunk facilities comparable to those provided by a CRC for use on similar long-haul flights, where access to the bunk facilities is limited to the passengers, those allowed access by the passengers, or cabin crew.

The incorporation of rest cabins for pilots and crew of an aircraft, and occasionally for passengers as well, includes a variety of approaches. For example, U.S. Pat. No. 5,784,836 discloses a removable sleeping compartment assembly that may nest together several different modules incorporating sleeping berths, restroom facilities, and other convenience features. For instance, the modules may have an exterior configuration or form factor similar to that of a cargo container. In addition, entry to the sleeping compartments may be achieved by a pivotable staircase or lift system from the main deck. By way of another example, U.S. Pat. Nos. 6,182,926; 6,305,645; and 6,520,451 disclose a variety of configurations for a crew rest station contoured to occupy the overhead space between the curved top hull of the aircraft and the lowered ceiling and providing bunk portions, lavatory facilities, and storage space. For instance, the crew rest station may be located in the approximate midsection of the aircraft and accessible via an entry ladder, with forward, aft, or side bunk facilities arranged around a central deck. By way of another example, U.S. Pat. No. 8,991,756 discloses a crew rest station including an overhead crew rest portion with forward and aft bunk portions arranged around a central deck portion. For instance, the central deck portion includes an emergency escape hatch, a fold-down jump seat, and a fold-down entry door capable of covering a stairway of a central entry vestibule, via which the overhead crew rest portion may be accessed from the passenger seating area.

Such compartments may be required to meet regulatory requirements for passenger rest compartments in aircraft as set forth by the Federal Aviation Administration (FAA) of the United States Government (e.g., codified regulations, special conditions rules, advisory circulars, or the like). In addition, the passenger rest facilities should be easily accessible to participating passengers occupying the premium areas while minimizing added weight and minimizing disruption to the interior space and passenger seating within the premium areas.

SUMMARY

In one aspect, embodiments of the inventive concepts disclosed herein are directed to an aircraft suite. The aircraft suite may include a passenger compartment disposed on a main deck of an aircraft. The passenger compartment may be partitioned from a main passenger cabin of the main deck by at least one bulkhead. The passenger compartment may include an aircraft seat and a hatch set within an opening in a floor of the passenger compartment. The aircraft suite may include a lower lobe rest compartment integrated in a cargo deck below the main deck. The lower lobe rest compartment may be proximate to the passenger compartment. The lower lobe rest compartment may include a passenger rest compartment and a device proximate to the hatch. The device may be configured to assist a passenger to descend into the lower lobe rest compartment from the passenger compartment via the hatch. The device may be configured to assist a passenger to ascend into the passenger compartment from the lower lobe rest compartment via the hatch.

In a further aspect, embodiments of the inventive concepts disclosed herein are directed to an aircraft suite. The aircraft suite may include a passenger compartment disposed on a main deck of an aircraft. The passenger compartment may be partitioned from a main passenger cabin of the main deck by at least one bulkhead. The passenger compartment may include a first aircraft seat, an additional aircraft seat, and a hatch set within an opening in a floor of the passenger compartment. The aircraft suite may include a lower lobe rest compartment integrated in a cargo deck below the main deck of the aircraft. The lower lobe rest compartment may be proximate to the passenger compartment. The lower lobe rest compartment may include a first passenger rest compartment, an additional passenger rest compartment, and a device proximate to the hatch. The device may be configured to assist at least one of a first passenger or an additional passenger to descend into the lower lobe rest compartment from the passenger compartment via the hatch. The device may be configured to assist one or more of the first passenger or the additional passenger to ascend into the passenger compartment from the lower lobe rest compartment via the hatch.

In a further aspect, embodiments of the inventive concepts disclosed herein are directed to an aircraft. The aircraft may include one or more overhead sleeping cabins in a crown area above a main deck. The one or more overhead sleeping cabins may be configured based on one or more dimensions of at least one monument installed in a main passenger cabin of the main deck. The one or more overhead sleeping cabins may include one or more modular sections. The one or more dimensions of a ceiling of the main passenger cabin may be configured based on a corridor in the one or more overhead sleeping cabins. The aircraft may include one or more lower lobe passenger rest cabins in a cargo deck below the main deck. The one or more lower lobe passenger rest cabins including one or more modular sections. The aircraft may include one or more vestibules coupling the aisle to at least one of the crown area or the cargo deck. The aircraft may include an aircraft suite. The aircraft suite may include a passenger compartment disposed on the main deck. The passenger compartment may be partitioned from the main passenger cabin by at least one bulkhead. The passenger compartment may include an aircraft seat and a hatch set within an opening in a floor of the passenger compartment. The aircraft suite may include a lower lobe rest compartment integrated in the cargo deck. The lower lobe rest compartment may be proximate to the passenger compartment. The lower lobe rest compartment may include a passenger rest compartment and a device proximate to the hatch. The device may configured to assist a passenger to descend into the lower lobe rest compartment from the passenger compartment via the hatch. The device may configured to assist a passenger to ascend into the passenger compartment from the lower lobe rest compartment via the hatch.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9B is a front view of an exemplary embodiment of an aircraft including an aircraft suite with a main cabin compartment and a lower lobe rest compartment according to the inventive concepts disclosed herein;

DETAILED DESCRIPTION OF EXEMPLARY EMBODIMENTS

Figure 1:
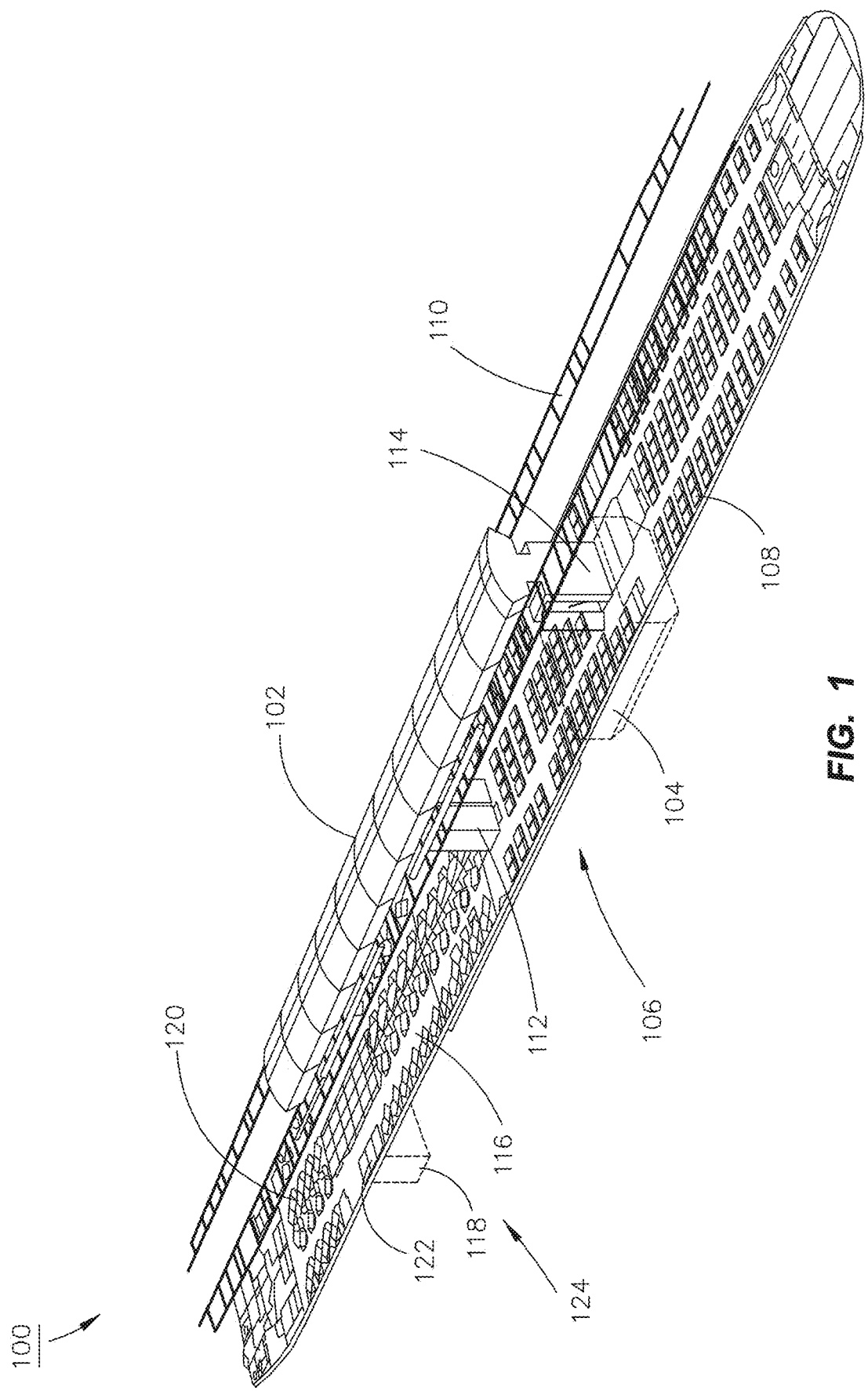
FIG. 1 is an exemplary embodiment of an aircraft according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

FIGS. 1-10E generally illustrate exemplary embodiments of an aircraft including an aircraft suite with a main cabin compartment and a lower lobe rest compartment in accordance with the inventive concepts disclosed herein.

Broadly, embodiments of the inventive concepts disclosed herein are directed to a passenger aircraft capable of providing passenger rest compartments (or "rest compartments") in passenger rest cabins (or "rest cabins") for passengers within remote areas of the aircraft, where "remote areas" refers to portions of the aircraft outside the main passenger cabin (or "main cabin") on the main deck (or "main cabin deck") potentially occupyable (or occupiable) by passengers.

More particularly, embodiments of the inventive concepts disclosed herein are directed to passenger rest compartments adjacent to and accessible from selected lay-flat and/or tracked aircraft seats. For example, first-class, business-class, or equivalent passengers may be assigned main-deck seats (e.g., in a private compartment or aircraft suite) capable of tracking backward or forward, and/or capable of reconfiguration into a lay-flat state whereon the passenger may occupy the seat in a prone position. The lay-flat seats or tracking mechanisms may, or may not, at least partially conceal a hatch set into the main deck floor, through which the occupying passenger may access a private or semi-private compartment in a lower lobe rest compartment under the main passenger cabin (e.g., in a cargo deck). The private or semi-private compartment (e.g., two adjacent seats may share a compartment) may provide an alternative seating area or bunk area for the passenger while preserving available space on the main deck for other seating facilities. The compartments may be windowless but equipped with "virtual windows." It is contemplated that the passenger rest compartments will not be occupied by passengers during taxi, takeoff and landing (TTL) flight segments. Rather, passengers will occupy assigned seats (e.g., in the private compartment or aircraft suite) during the TTL flight segments.

In addition, embodiments of the inventive concepts disclosed herein are directed to passenger rest compartments (e.g., berths, bunks) which may be incorporated into passenger rest cabins in the overhead crown area of the fuselage, directly above the main passenger cabin. Further, rest compartments may be incorporated into passenger rest cabins in the lower lobe area under the main passenger cabin (e.g., in the cargo deck).

These passenger rest compartments may be incorporated into a larger cabin structure above or below the main passenger cabin (e.g., the main adjacent cabin being adjacent to first-class, business-class, or equivalent passenger sections of the aircraft), and may be accessible from the main passenger cabin by passengers (e.g., when the aircraft reaches a safe cruising altitude). Unlike rest cabins dedicated to use by aircraft pilots and cabin crew (e.g., CRC), the passenger rest cabins may be accessible (e.g., not isolated) from the main passenger cabin. The passenger rest cabins and individual rest compartments may incorporate additional safety features and amenities developed with passenger use in mind.

It is contemplated that passenger rest compartments above or below the main passenger cabin will not be occupied by passengers during taxi, takeoff and landing (TTL) flight segments. Rather, passengers will occupy assigned seats in the main passenger cabin during the TTL flight segments. When the aircraft reaches a safe cruising altitude (e.g., when passengers are generally permitted to leave occupied seats), passengers having access to a rest compartment may be permitted to access the assigned rest compartment if so desired. Passenger access to rest compartments above or below the main passenger cabin may be via a dedicated vestibule adjacent to one or more aisles (e.g., adjacent to, and accessible via, both aisles of a double-aisle aircraft). Access doors in the vestibule may lead to compact staircases or similar means of ascent or descent by which passengers may reach the overhead or lower lobe rest cabins. Each remote area of the aircraft that the rest cabins are incorporated (e.g., the overhead crown area or lower-lobe cargo deck) may include a dedicated ascent/descent device, such that the progress of passengers wishing to ascend into an overhead cabin is not obstructed by that of passengers wishing to descend into the lower lobe area. The rest cabins may incorporate a transitional space or landing between the ascent/descent staircase and the individual bunks, which space may include a station space where flight attendants and crew may access for emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be assigned to monitoring the rest cabins during flight. It is noted herein, however, that the crewmembers may remotely monitor the rest cabin from the main deck (e.g., via the aforementioned sensor system), responding to the rest cabin if attention is required. A flight attendant/crew station may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. A second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main cabin and occupy assigned seats. In some cases, cabin crew may advise those passengers occupying rest compartments to remain there, e.g., until it is determined that passengers may safely return to the assigned seats. Each rest compartment may include a bunk occupyable (or occupiable) by a passenger in a prone or reclined position, allowing the passenger to rest or sleep. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central corridor, by which each bunk may be accessed.

It is contemplated that cabin crew may not be physically present to monitor rest cabins in person, although some rest cabins may be configured to include a seating element temporarily occupyable (or occupiable) by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. For instance, the sensors and/or cameras may monitor the presence or absence of passengers, movement, and heat signatures, alerting the cabin crew if conditions warrant. Should conditions be consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time), the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Portable fire containment bags (FCB) may be securely stored throughout the overhead and lower lobe rest cabins for the containment of any mobile devices or batteries thereof determined to be at risk of combustion. Infrared temperature sensors may be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, a call button, panic button, and an adjustable gasper outlet. Each rest compartment may further include a two-way audio connection so that the occupant may communicate with cabin crew. Rest compartments may incorporate work surfaces that fold out or down into the compartment from the bulkhead (e.g., wall) or ceiling for the temporary use of occupants. As individual rest compartments may lack a physical window, the compartments may incorporate a "virtual window," or a display surface connected to exterior cameras or image sensors that may provide attitude cues to the occupant via externally captured images. The display surface may be embedded into the compartment bulkhead or pivotably attached, such that a single display surface may serve as a virtual window while substantially flush with the bulkhead but may be pivoted out or down for access to the in-flight entertainment system.

A passenger rest cabin incorporated into the overhead crown area may be modular (e.g., including one or more connected or linked modules), such that the size of the passenger rest cabin may be scaled up or down depending on the size of the embodying aircraft or the desired number of rest compartments. The one or more modular overhead passenger rest cabins may be easily installed into the aircraft during an outfitting or refitting, with portions of the modular overhead rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched," or partially reduced in height or truncated, to accommodate the overhead rest cabin.

As noted above, it is contemplated that the overhead passenger rest cabin will not be occupied by passengers during any flight segment or under any conditions where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead passenger rest cabin warrant the evacuation of passengers or the rapid intervention of cabin crew, the bi-directional hatches may include access ladders that deploy downward into the main cabin. Passengers may rapidly exit the overhead passenger rest cabin, and cabin crew may likewise rapidly ascend into the overhead passenger rest cabin, via the access ladders. Bi-directional hatches may be easily deployable by passengers. For example, a single lever or button may release the access ladder from its restraints while activating any necessary emergency lights or warnings.

The overhead passenger rest cabins, as noted above, may incorporate individual rest compartments situated along either side of a central corridor. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals, sized and placed to reduce strain associated with remaining in a crouched position while traversing the corridor. The access corridor may include shifts in lighting or ventilation along its length to prevent claustrophobia, and/or transitional spaces may be positioned along the corridor to "break up" the space.

The lower lobe rest cabins may be modular in nature. For example, the lower lobe rest cabins may be sized and shaped to match the proportions of a cargo container, such that one or more rest cabins may be easily incorporated into the lower cargo deck. The modular rest cabins may likewise include dedicated entry and exit portals and electrical, airflow, and other service connections, such that the overall amount of available lower lobe bunk space may be scaled up or down as needed or desired. For example, passengers may descend into a first lower lobe rest cabin, which may include transitional space and/or temporary crew seating facilities, and pass into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full-size rest compartment or bunk shared between the two cabins, where neither the first space nor the second space would alone be large enough to accommodate a full rest compartment.

FIGS. 1-6 generally illustrate an aircraft 100 configured to include a reserved lower lobe rest compartment in an aircraft according to the inventive concepts disclosed herein.

FIG. 1 illustrates an exemplary embodiment of an aircraft 100 according to the inventive concepts disclosed herein.

The aircraft 100 may include one or more overhead passenger rest cabins 102 and/or one or more lower lobe passenger rest cabins 104. For example, the aircraft 100 may include only overhead passenger rest cabins 102, only lower lobe passenger rest cabins 104, or both. The overhead passenger rest cabins 102 may be incorporated into the overhead crown area of the aircraft 100, above a main passenger cabin 106. The main passenger cabin 106 may include one or more passenger seats 108, one or more overhead bins 110, and/or one or more monuments 112 (e.g., storage monuments, galley monuments, audio-visual monuments housing an in-flight entertainment system, lavatories, or the like). Lavatories, monuments 112, zone dividers, or other structures proximate to the longitudinal center of the main passenger cabin 106 may be notched or otherwise modified to accommodate the overhead passenger rest cabin 102. The lower lobe passenger rest cabins 104 may be incorporated on a cargo deck directly underneath the main passenger cabin 106.

Passengers may access the overhead passenger rest cabins 102 and/or the lower lobe passenger rest cabins 104 via one or more entry vestibules 114 located within the main passenger cabin 106. The entry vestibules 114 may connect the overhead passenger rest cabins 102 and the lower lobe passenger rest cabins 104 (when both are incorporated within the aircraft 100). For example, the one or more entry vestibules 114 may provide a separate path for passengers to access each rest cabin from the main passenger cabin 106 (e.g., via ascending or descending staircases), such that the one or more entry vestibules 114 are bi-directional. The entry vestibules 114 may be the primary means of passenger access (and/or sole means during non-emergency conditions) to the overhead passenger rest cabins 102 and/or the lower lobe passenger rest cabins 104. The one or more entry vestibules 114 may be located at the aft end of the overhead passenger rest cabin 102, and an auxiliary vestibule (114a) may provide a secondary entrance and exit to and from the main passenger cabin 106 and the overhead passenger rest cabin 102.

It is noted herein, however, that the overhead passenger rest cabins 102 may include additional escape hatches providing an emergency escape route for passengers to rapidly exit the overhead passenger rest cabins (e.g., to an aisle 116 of the main passenger cabin 106). In addition, it is noted herein the lower lobe passenger rest cabins 104 may similarly include escape hatches for emergency return to the main passenger cabin 106.

The aircraft 100 may incorporate additional lower lobe rest compartments 118 situated on the lower cargo deck. For example, the additional lower lobe rest compartments 118 may be located proximate to (e.g., substantially underneath) selected partitioned premium seats 120 (e.g., main cabin partitioned seats) or premium compartments 122 (e.g., main cabin compartments) in premium seating sections of the aircraft 100 and accessible to the occupants of the premium seats 120 or the premium compartments 122 via proximate hatches in a main deck floor (e.g., during safe cruising segments). The premium compartments 122 and the partitioned premium seats 120 may be partitioned (e.g., separated) from the main passenger cabin 106 via one or more bulkheads. A premium compartment 122 and a lower lobe rest compartment 118 may be considered an aircraft suite 124, for purposes of the present disclosure.

Figure 2:
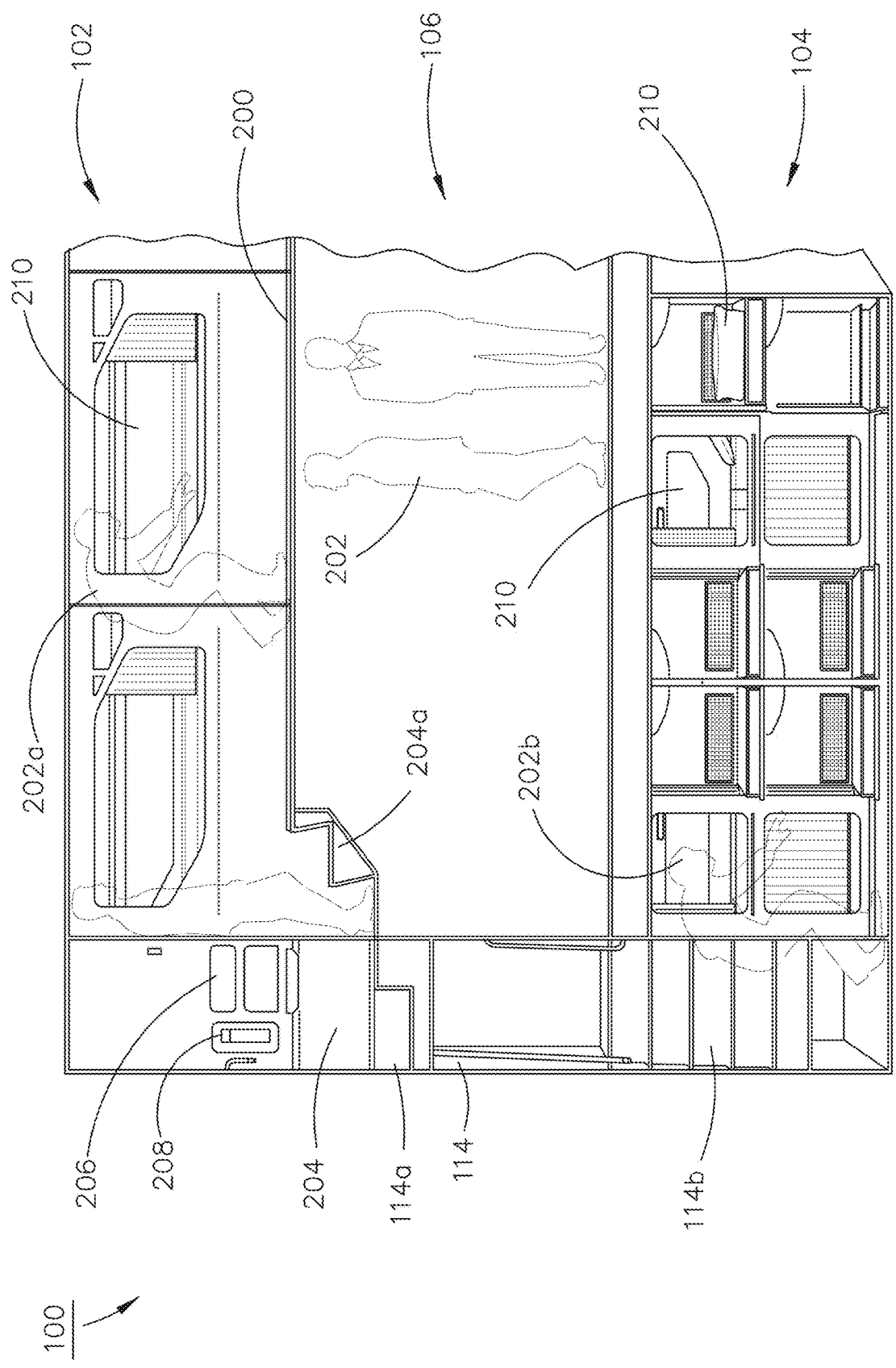
FIG. 2 is a cross-section view of an exemplary embodiment of an aircraft according to the inventive concepts disclosed herein.

FIG. 2 illustrates a cross-section view of an exemplary embodiment of the aircraft 100 according to the inventive concepts disclosed herein.

The aircraft 100 may include an overhead passenger rest cabin 102 and a lower lobe passenger rest cabin 104 connected by an entry vestibule 114 to the main passenger cabin 106, where the entry vestibule 114 includes one or more steps 114a, 114b. For example, the overhead passenger rest cabin 102 may be incorporated into a remote space above the main passenger cabin 106 such that the floor of a central corridor 200 of the overhead passenger rest cabin corresponds substantially to the ceiling of the main passenger cabin 106 (e.g., over the centermost portion of the main cabin). For instance, an entry vestibule 114 may be coupled to each end of the central corridor 200 and the main passenger cabin 106. The height of the overhead passenger rest cabin 102 may allow a passenger 202 of average height to remain comfortably standing underneath the overhead passenger rest cabin 102 (e.g., in an aisle 116 of the main passenger cabin 106). However, space limitations within the aircraft 100 may require passengers 202a and/or 202b traversing the overhead passenger rest cabin 102 and/or the lower lobe passenger rest cabin 104, respectively, to do so in a partially crouched position.

The overhead passenger rest cabin 102 may include a transitional space 204 between the entry vestibule 114 and the central corridor 200. The transitional space 204 may include additional steps 204a linking the entry vestibule 114 and the central corridor 200. The transitional space 204, one or more of the entrances into the corridor 200, and/or the lower lobe passenger rest cabin 104 may include emergency equipment storage 206 and/or an emergency handset 208 for communicating with the cockpit or cabin crew. It is noted herein, however, that the entry vestibule 114 may be configured such that the one or more steps 114a connect the central corridor 200 with the aisle 116, such that the transition space 204 and/or the one or more steps 204a are not integral or required.

The overhead passenger rest cabin 102 may include one or more individual passenger rest compartments 210 or bunks extending along either side of the central corridor 200, substantially parallel to the longitudinal or roll axis of the aircraft 100. The lower lobe passenger rest cabin 104 may incorporate one or more individual passenger rest compartments 210 aligned substantially parallel to the roll axis as well as passenger rest compartments 210 aligned at an angle to the roll axis, e.g., perpendicular to the roll axis or substantially parallel to the pitch axis of the aircraft 100.

Figure 3A:
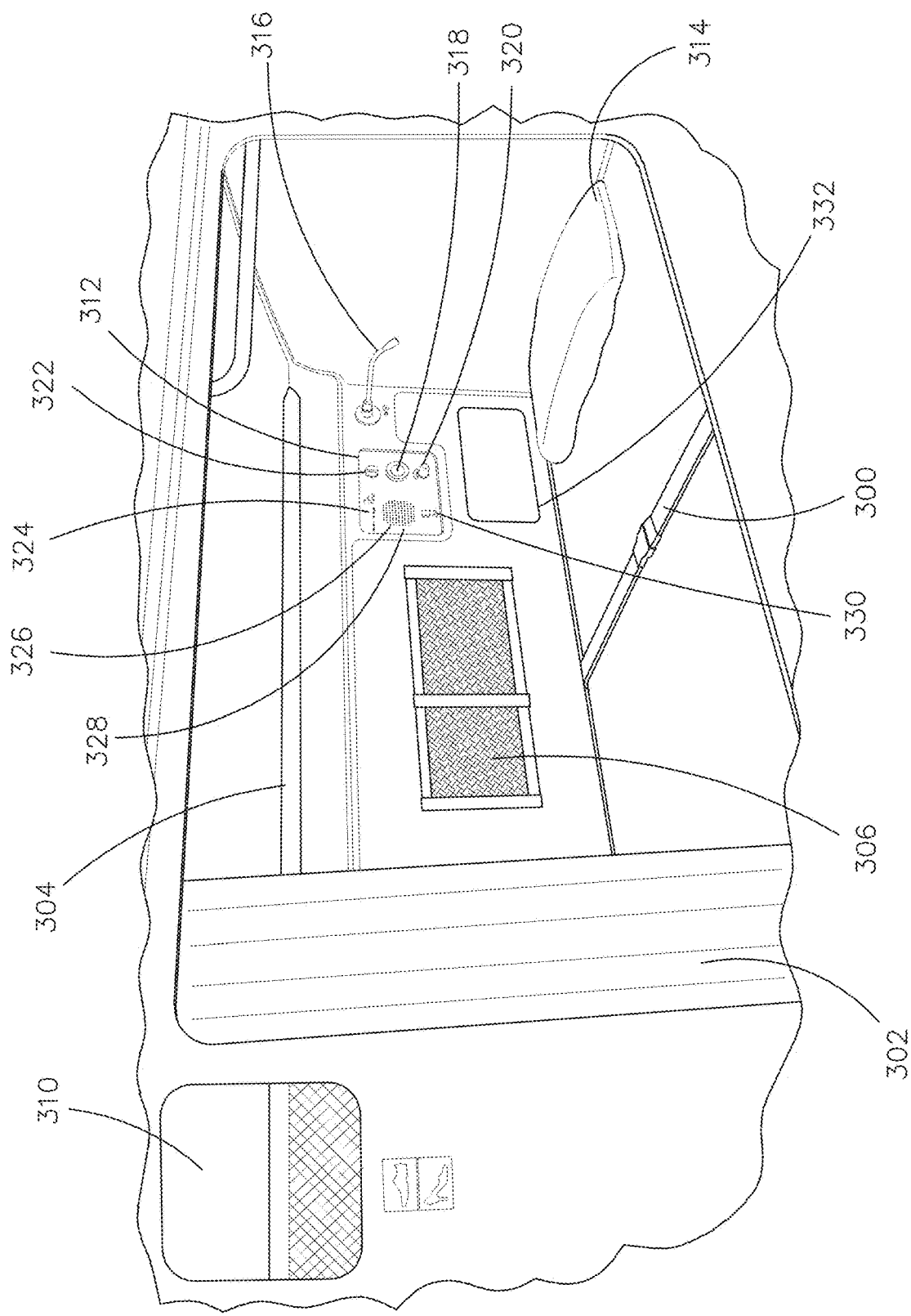
FIG. 3A is a head-end isometric view of an exemplary embodiment of a passenger rest compartment of an aircraft according to the inventive concepts disclosed herein.
Figure 3B:
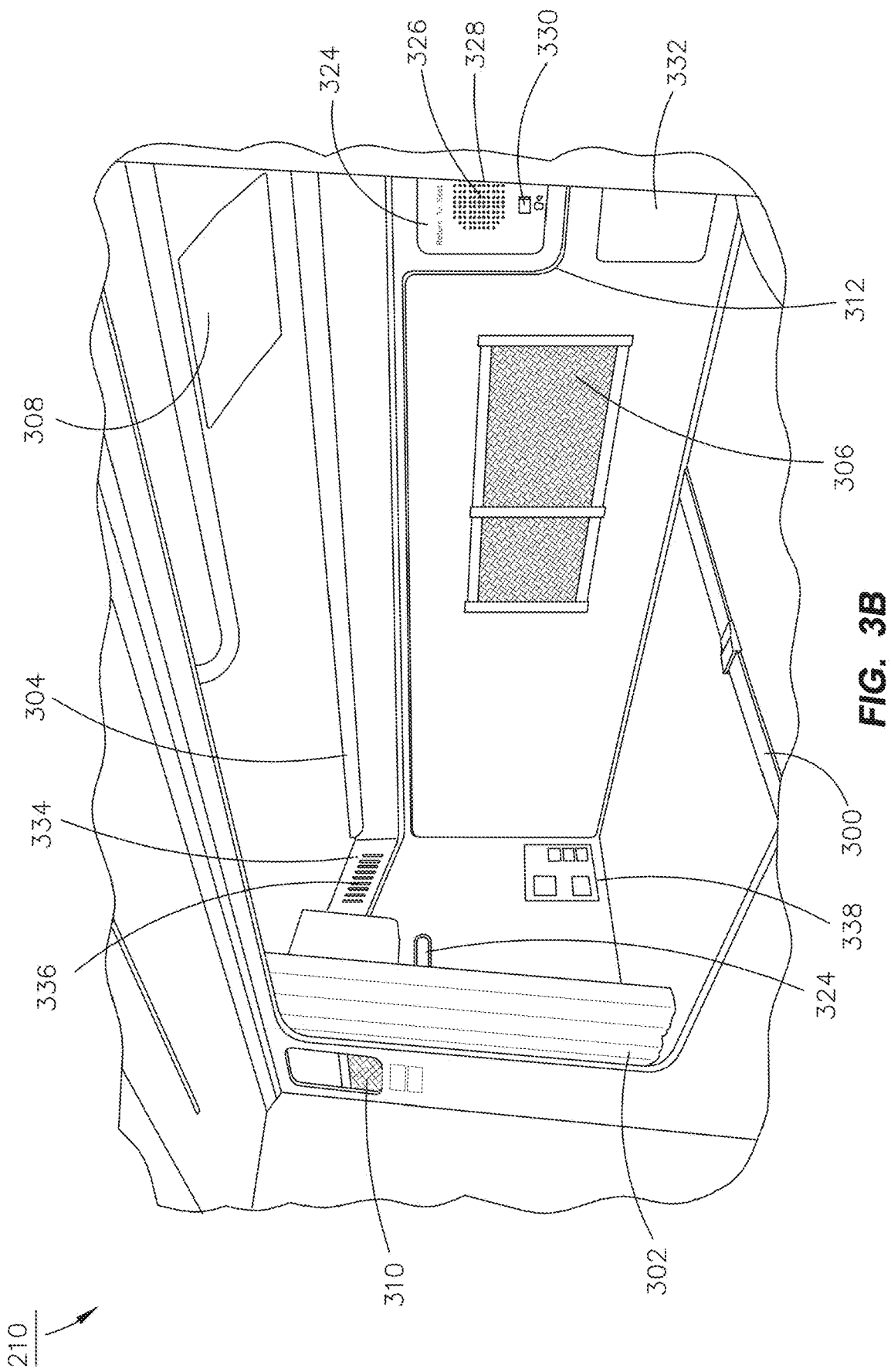
FIG. 3B is a foot-end isometric view of an exemplary embodiment of a passenger rest compartment of an aircraft according to the inventive concepts disclosed herein.

FIGS. 3A and 3B generally illustrate an exemplary embodiment of the passenger rest compartment 210 of the aircraft 100 according to the inventive concepts disclosed herein.

The passenger rest compartment 210 (e.g., bunk) may include one or more of a safety belt 300, a privacy partition 302 (e.g., privacy curtain constructed from a material including but not limited to, a plastic or a fabric, where the material may or may not include sound-dampening properties), ambient lighting 304, an interior stowage compartment 306, an emergency oxygen drop 308, a stowage compartment 310 (e.g., a ventilated shoe stowage compartment) in a wall of the passenger rest compartment 210. For example, the stowage compartment 310 may be accessed immediately outside or adjacent to the passenger rest compartment 210. By way of another example, the stowage compartment may include a door and/or an opening in an exterior surface and/or in an interior surface. The passenger rest compartment 210 may include one or more fire-proof components (e.g., a permanent or removable pouch, bag, or containment section) configured to hold a personal electronic device (e.g., cell phone, or the like). The passenger rest compartment 210 may include one or more stowable tables (e.g., foldable into/out of a bulkhead, retractable into/pullable out of a bulkhead, or the like) including one or more independently adjustable sections.

The passenger rest compartment 210 may include a passenger service unit 312 (PSU). For example, the PSU 312 may be positioned proximate to the head end of the rest compartment 210 (e.g., where a pillow 314 may be provided for the passenger's head). By way of another example, the PSU 312 may include a positionable reading light 316 and/or a gasper air outlet 318, one or more temperature controls 320, a crew call button 322, and/or lighted signage 324 (e.g., signaling the occupying passenger to return to his/her seat, fasten his/her safety belt 300, not to smoke, or the like). By way of another example, the PSU 312 may include a microphone 326, a speaker 328, and/or a call button 330 allowing two-way audio communication between the occupying passenger and the cabin crew. By way of another example, the PSU 312 may include one or more controls (e.g., one or more input devices including, but not limited to, a keyboard, a keypad, a touchscreen (e.g., a capacitive touchscreen, a resistive touchscreen, a surface acoustic based touchscreen, an infrared based touchscreen, or the like), a lever, a knob, a scroll wheel, a track ball, a switch, a dial, a sliding bar, a scroll bar, a slide, a handle, a touch pad, a paddle, a steering wheel, a joystick, or the like).

The passenger rest compartment 210 may include one or more displays 332. For example, the one or more displays 332 may be mounted to a side bulkhead, either directly (e.g., within a recess or via a bulkhead mount bracket) or indirectly (e.g., via one or more adjustable (e.g., extendable and/or positionable) swing arm-and-bracket assemblies configured to reposition (e.g., translate and/or rotate) the one or more displays 332 relative to a position of a passenger within the passenger rest compartment 210). By way of another example, the one or more displays 332 may be mounted to a ceiling of the passenger rest compartment 210. It is noted herein the one or more displays 332 may be configured as an in-flight entertainment system display for in-flight entertainment and/or flight information. Providing in-flight information is further described in U.S. patent application Ser. No. 15/382,633, filed Dec. 17, 2016, previously incorporated herein by reference in its entirety. In addition, providing in-flight information is further described in U.S. patent application Ser. No. 14/645,526, filed Dec. 17, 2016 and issued as U.S. Pat. No. 9,996,754, previously incorporated herein by reference in its entirety.

In addition, it is noted herein the one or more displays 332 may be configured as a virtual window display for displaying images and/or video.

The passenger rest compartment 210 may include one or more air flow components 334 (e.g., the gasper air outlet 318, air returns, or the like). The passenger rest compartment 210 may include one or more sensors 336. The passenger rest compartment 210 may include one or more outlets 338 (e.g., including one or more pronged outlets, one or more universal serial bus (USB) outlets, one or more switch outlets, or the like).

Figure 4A:
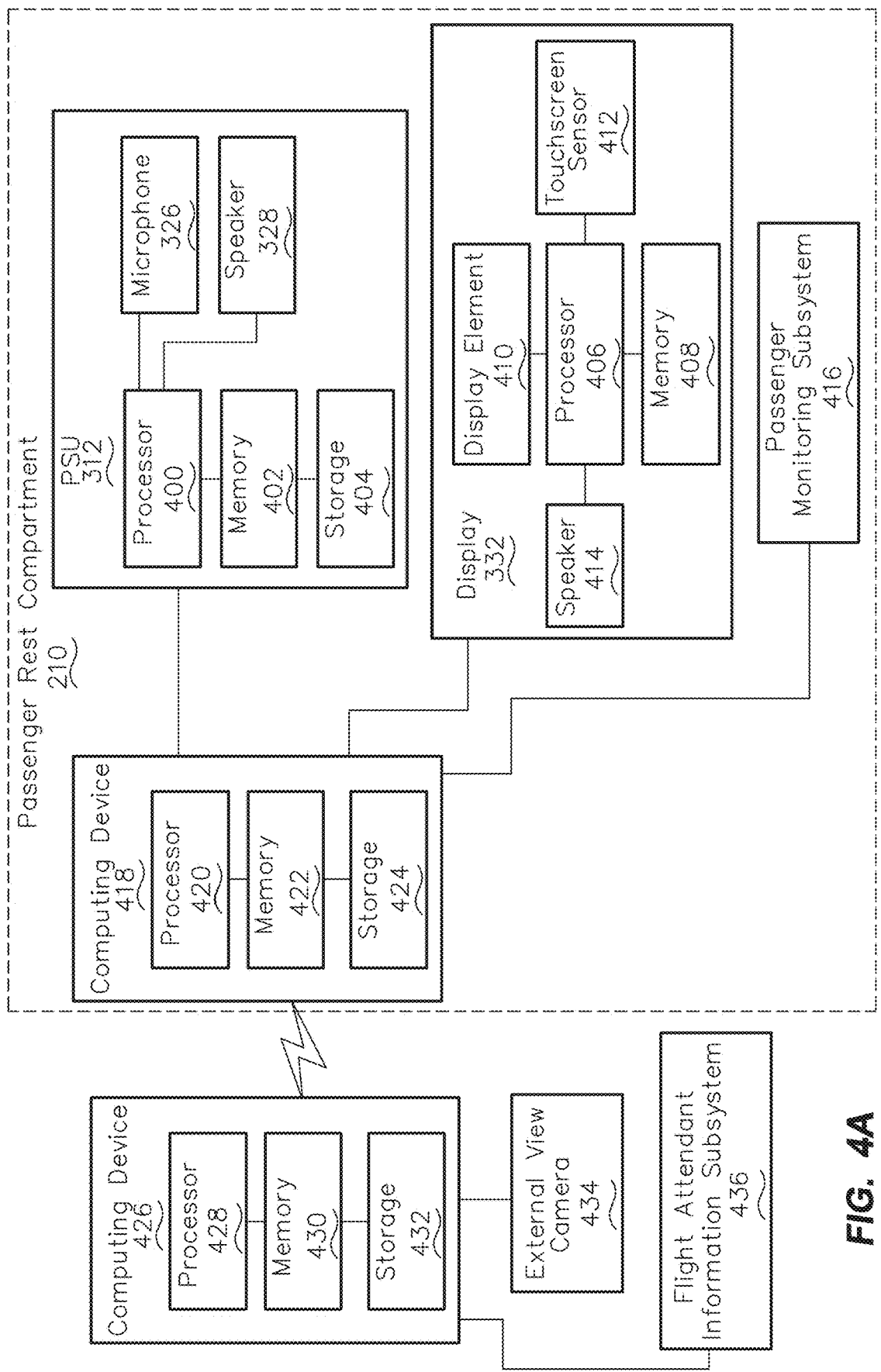
FIG. 4A illustrates a block diagram including electronic components of an aircraft according to the inventive concepts disclosed herein.
Figure 4B:
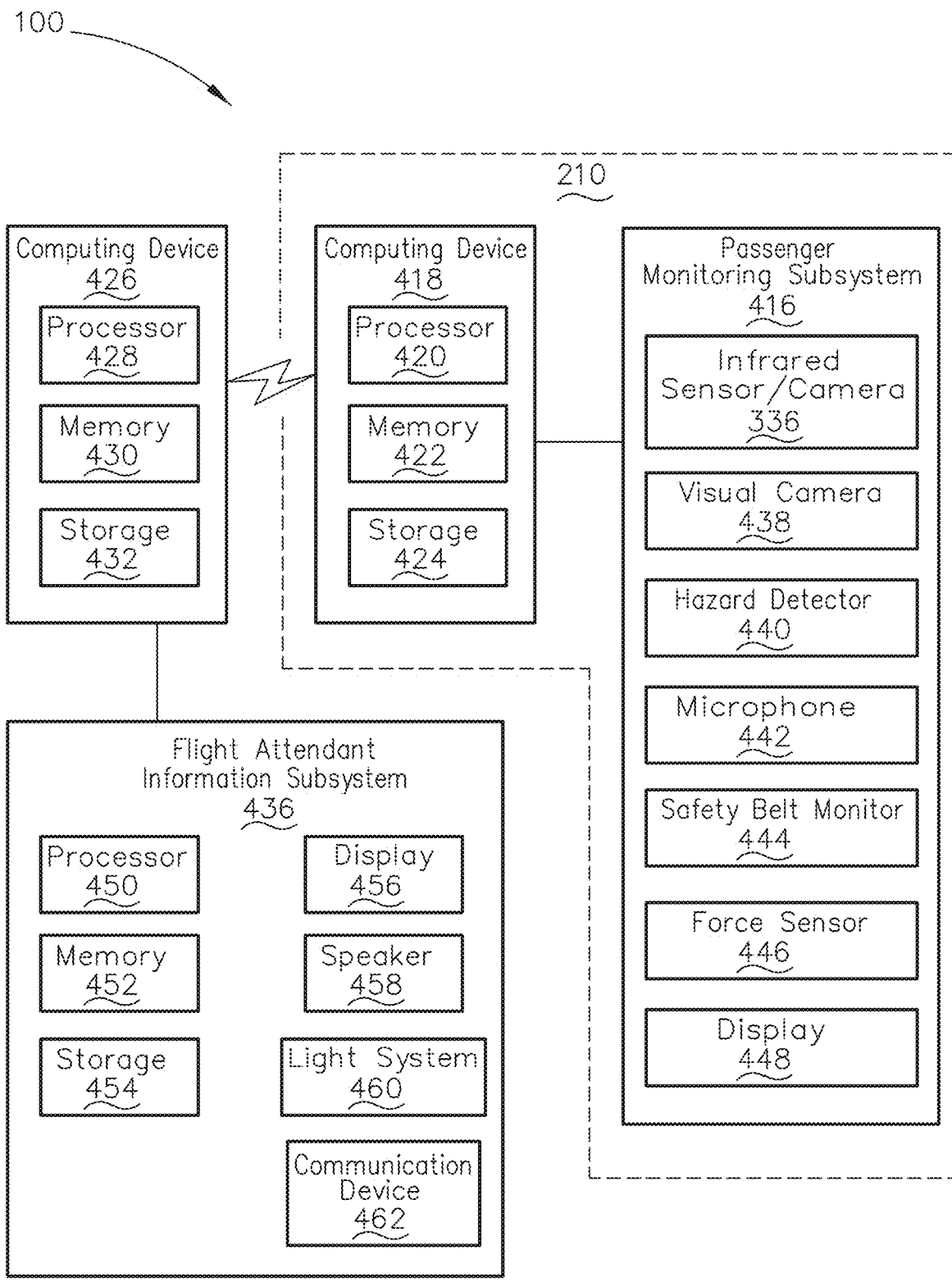
FIG. 4B illustrates a block diagram including electronic components of an aircraft according to the inventive concepts disclosed herein.

FIGS. 4A and 4B illustrate block diagrams including electronic components of the aircraft 100 and the passenger rest compartment 210 according to the inventive concepts disclosed herein.

Referring now to FIG. 4A, the PSU 312 of the passenger rest compartment 210 may include one or more processors 400, memory 402, storage 404, the microphone 326, the speaker 328, and/or other components, equipment, and/or devices commonly included in a computing device, some or all of which may be communicatively coupled.

The one or more displays 332 of the passenger rest compartment 210 may include one or more processors 406, memory 408, one or more display elements 410, one or more touchscreen sensors 412, one or more speakers 414, and/or other components, equipment, and/or devices commonly included in a computing device, some or all of which may be communicatively coupled. The one or more displays 332 may include any display known in the art including, but not limited to, a transmissive display (e.g., an LCD display), an emissive display (e.g., a light-emitting diode (LED) display, a micro-LED display, an organic light-emitting diode (OLED) display, an active-matrix OLED (AMOLED) display, a passive-matrix OLED (PMOLED) display, a light-emitting electrochemical cell (LEC) display), an electroluminescent display (ELD), an electronic paper (E-ink) display, a plasma display panel (PDP), a display light processing (DLP) display, a touchscreen display, or the like.

The passenger rest compartment 210 may include a passenger monitoring subsystem 416. Referring now to FIG. 4B, the passenger monitoring subsystem 416 may include the one or more sensors 336. For example, the one or more sensors 336 may receive light of a wavelength in the visible light spectrum wavelength range (e.g., 500 nanometers (nm)-700 nm), the infrared spectrum wavelength range (e.g., 700 nm-1000 nm or 1 millimeter (mm)), or any other spectrum wavelength range known in the art. For instance, the one or more sensors 336 may include one or more visual sensors and/or one or more infrared sensors. The passenger monitoring subsystem 416 may include one or more cameras 438, one or more hazard detectors 440, one or more microphones 442 (e.g., which may be shared with the PSU 312), a safety belt monitor 444, one or more force sensors 446, one or more displays 448 (e.g., which may be shared with the one or more displays 332), and/or other components, equipment, and/or devices commonly included in a computing device, some or all of which may be communicatively coupled.

The passenger monitoring subsystem 416 may be configured to monitor one or more of location and/or presence of one or more passengers in the passenger rest compartment 210, activity state of a passenger in the passenger rest compartment 210, whether a passenger is secured within the passenger rest compartment 210, sound/noise levels in the passenger rest compartment 210, temperature of the passenger rest compartment 210, and/or existence of hazards within the passenger rest compartment 210 (e.g., smoke, carbon monoxide, electrical issues, or the like). For example, the passenger monitoring subsystem 416 may be used to detect a body temperature of a passenger and/or a heat signature (e.g., via infrared thermal imaging) corresponding to thermal runaway related to the possibility of a fire (e.g., a temperature of a smartphone battery ranging from 120 to 160 degrees Celsius).

Referring again to FIG. 4A, the passenger rest compartment 210 may include a computing device 418. The computing device 418 may include one or more processors 420, memory 422, storage 424, and/or other components, equipment, and/or devices commonly included in a computing device, some or all of which may be communicatively coupled. The computing device 418 may be communicatively coupled to (e.g., configured to transmit data/information to and/or receive data from) the PSU 312, the one or more displays 332, and/or the passenger monitoring subsystem 416.

The aircraft 100 may include a computing device 426. The computing device 426 may include one or more processors 428, memory 430, storage 432, and/or other components, equipment, and/or devices commonly included in a computing device, some or all of which may be communicatively coupled. The computing device 426 may be communicatively coupled to the computing device 418, one or more external view cameras 434, and/or a flight attendant management subsystem 436.

The one or more external view cameras 434 may record images and/or video and transmit the recorded images and/or video to the one or more display elements 410 of the one or more displays 332 via the computing device 418 and/or the computing device 426. It is noted herein, however, that the one or more images may be pre-recorded and stored within any memory or storage installed on the aircraft 100. In this regard, the one or more displays 332 may mimic an aircraft window.

Referring again to FIG. 4B, the flight attendant management subsystem 436 may include one or more processors 450, memory 452, storage 454, one or more displays 456, one or more speakers 458, one or more light systems 460, one or more communication devices 462, and/or other components, equipment, and/or devices commonly included in a computing device, some or all of which may be communicatively coupled. The flight attendant management subsystem 436 may be configured to provide one or more visual, graphical, and/or auditory signals to cabin crew based on information received from the passenger monitoring subsystem 416 via the computing device 418 and/or the computing device 426. The flight attendant management subsystem 436 may be configured to allow cabin crew to communicate with a passenger in a passenger rest compartment 210 via the PSU 312 and/or the passenger monitoring subsystem 416. For example, the flight attendant management subsystem 436 may be operable (e.g., a display may be viewable) by cabin crew while in a TTL position or strapped-down position.

Although the PSU 312, the one or more display devices 332, the passenger monitoring subsystem 416, the computing device 418, the computing device 426, and/or the flight attendant information subsystem 436 are illustrated as separate devices or subsystems, it is noted herein that some or all of the one or more display devices 332, the passenger monitoring subsystem 416, the computing device 418, the computing device 426, and/or the flight attendant information subsystem 436 may be a single integrated system or device or any number of integrated and/or partially integrated subsystems and/or devices of the aircraft 100. Therefore, the above description should not be interpreted as a limitation on the present disclosure but merely an illustration.

The one or more processors 400, 406, 420, 428, 450 may include any microprocessor device configured to execute algorithms and/or program instructions, including a general purpose processor, a specific purpose processor, an FPGA, an image processor, or the like. The one or more processors 400, 406, 420, 428, 450 may be configured to run various software applications or computer code stored (e.g., maintained) in a non-transitory computer-readable medium (e.g., memory 402, 408, 422, 430, 452 and/or storage 404, 424, 432, 454) and configured to execute various instructions or operations (e.g., execute one or more sets of program instructions configured to cause the one or more processors 400, 406, 420, 428, 450 to perform one or more actions.

The memory 402, 408, 422, 430, 452 and/or the storage 404, 424, 432, 454 may refer to one or more non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

The memory 402, 408, 422, 430, 452 and/or the storage 404, 424, 432, 454 may be housed in a common controller housing with the one or more processors 400, 406, 420, 428, 450. The memory 402, 408, 422, 430, 452 and/or the storage 404, 424, 432, 454 may, alternatively or in addition, be located remotely with respect to the spatial location of the processors 400, 406, 420, 428, 450. For instance, the one or more processors 400, 406, 420, 428, 450 may access a remote memory 402, 408, 422, 430, 452 and/or the storage 404, 424, 432, 454 (e.g., server), accessible through a network (e.g., internet, intranet, and the like).

Although the one or more processors 400, 406, 420, 428, 450 are illustrated as separate devices or subsystems, it is noted herein that some or all of the one or more processors 400, 406, 420, 428, 450 may be a single integrated system or device or any number of integrated and/or partially integrated subsystems and/or devices of the aircraft 100. In addition, although the memory 402, 408, 422, 430, 452 and the storage 404, 424, 432, 454 are illustrated as separate devices or subsystems, it is noted herein that some or all of the memory 402, 408, 422, 430, 452 and the storage 404, 424, 432, 454 may be a single integrated system or device or any number of integrated and/or partially integrated subsystems and/or devices of the aircraft 100.

Figure 5:
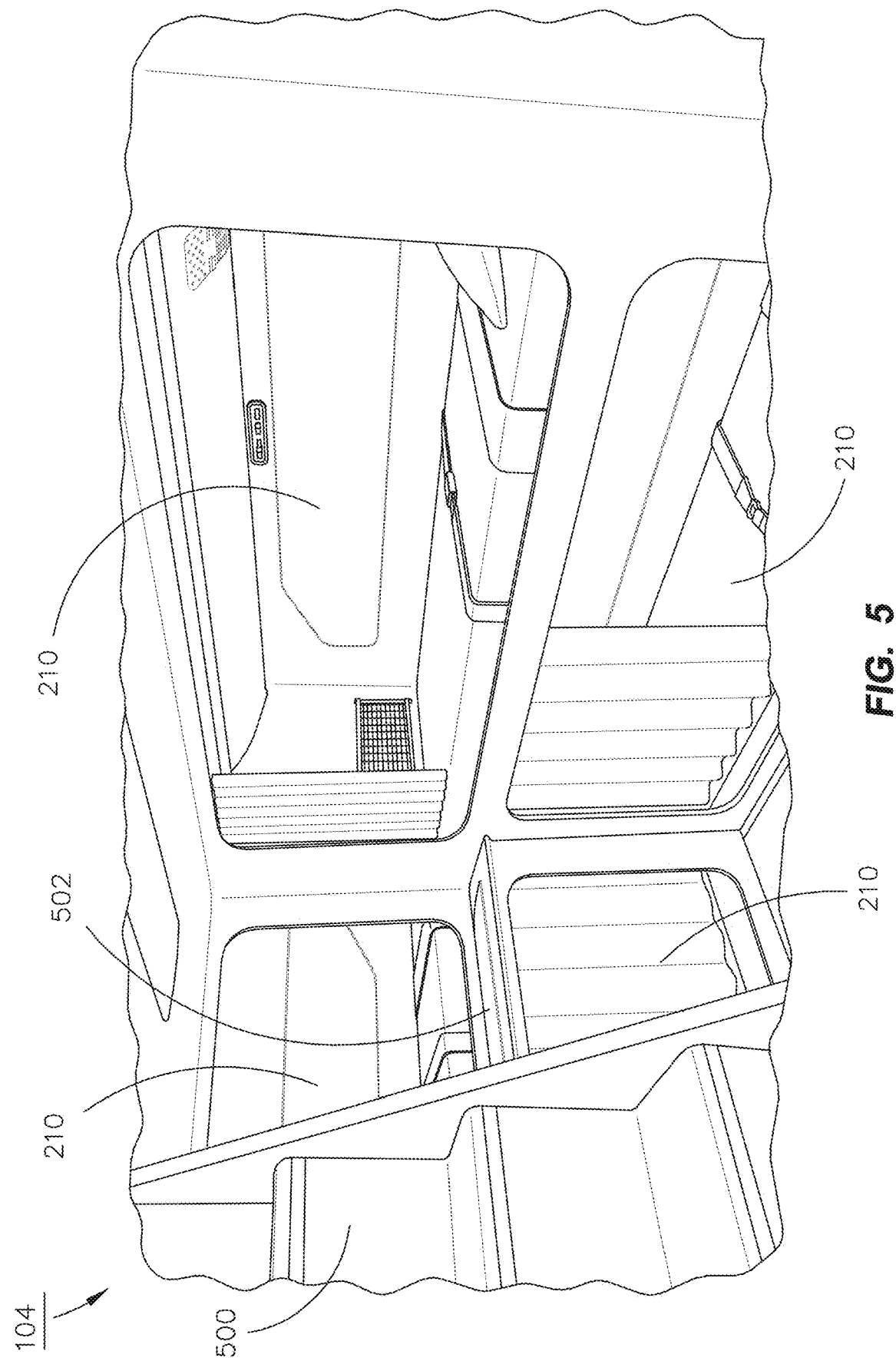
FIG. 5 is a partial isometric view of an exemplary embodiment of a lower lobe passenger rest cabin of an aircraft according to the inventive concepts disclosed herein.

FIG. 5 illustrates a partial isometric view of an exemplary embodiment of the lower lobe passenger rest cabin 104 of the aircraft 100 according to the inventive concepts disclosed herein.

The lower lobe passenger rest cabin 104 may be accessed by a descending staircase 500 connecting the lower lobe passenger rest cabin 104 to the entry vestibule 114 (e.g., as illustrated in FIG. 2) and thereby to the main passenger cabin 106 (e.g., as illustrated in FIG. 2). For example, the staircase 500 may descend into the center of the lower lobe passenger rest cabin 104 at a predetermined angle.

The one or more passenger rest compartments 210 of the lower lobe passenger rest cabin 104 may be oriented substantially parallel to and/or at an angle to (e.g., substantially perpendicular to) the longitudinal/roll axis of the aircraft 100 (e.g., as illustrated in FIGS. 1 and 2). The one or more passenger rest compartments 210 may be positioned around the perimeter of the lower lobe passenger rest cabin 104. The one or more passenger rest compartments 210 may be positioned in substantially vertical stacks of two or more bunks, depending on the height of the bunks relative to the height of the lower lobe passenger rest cabin 104. For example, two passenger rest compartments 210 may be stacked in a staggered fashion, set back from a third passenger rest compartment 210 by a shelf 502. By way of another example, two passenger rest compartments 210 may combine space from two adjacent modular lower lobe passenger rest cabins 104, where neither rest cabin 104 on its own may include sufficient space for a full passenger rest compartment 210. The lower lobe passenger rest cabins 104 may be proportioned for a form factor compatible with standard cargo containers; individual lower lobe passenger rest cabins may be palletized or otherwise capable of addition to, or removal from, the aircraft 100 via the existing cargo loading/unloading system. For example, depending on size, configuration, and desired capacity, the aircraft 100 may incorporate additional lower lobe passenger rest cabins 104 either forward or aft of the lower lobe passenger rest cabin 104 connected to the main passenger cabin 106 via the entry vestibule 114.

Figure 6:
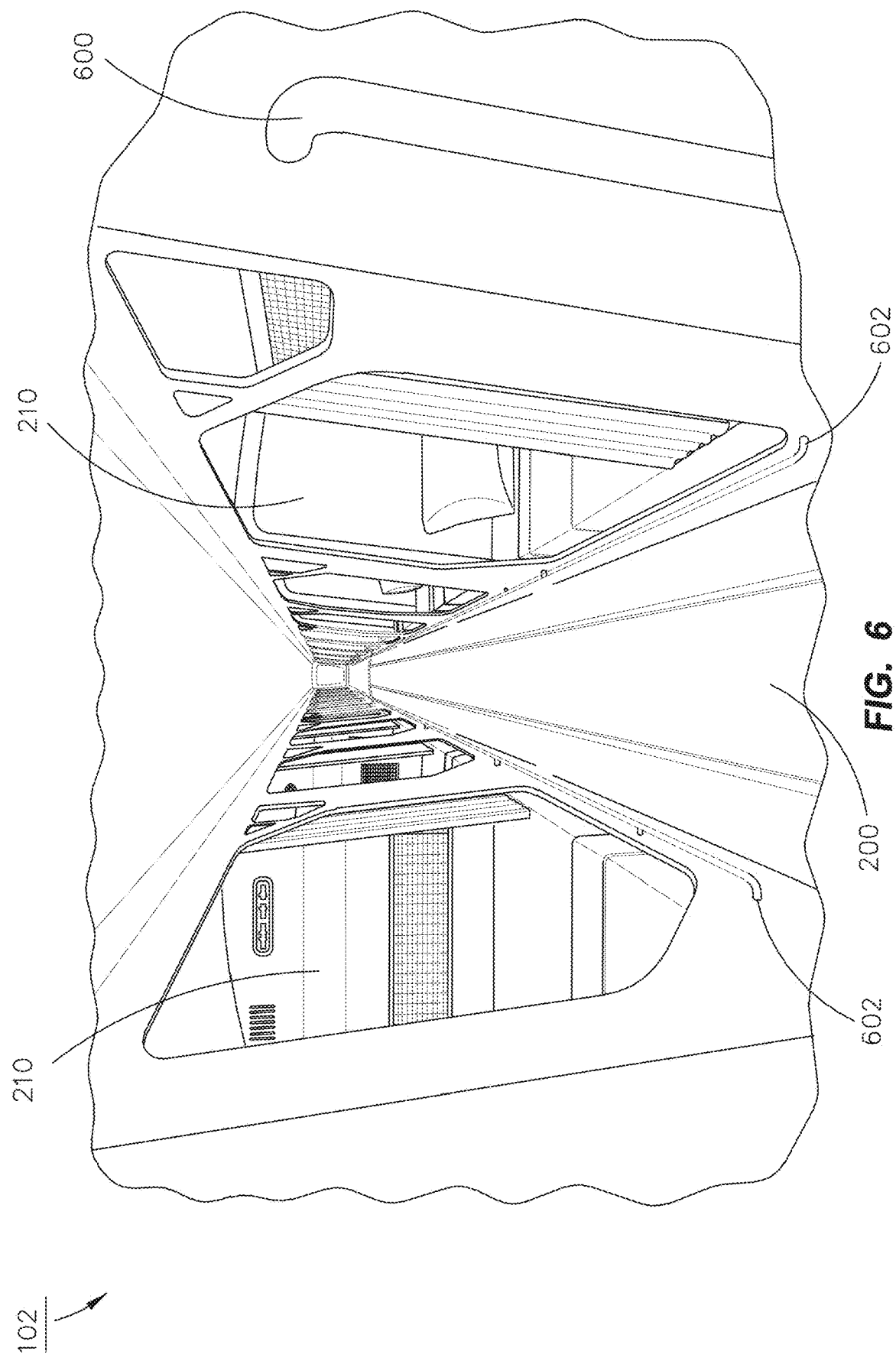
FIG. 6 is a partial longitudinal view of an exemplary embodiment of an overhead passenger rest cabin of an aircraft according to the inventive concepts disclosed herein.
Figure 7A:
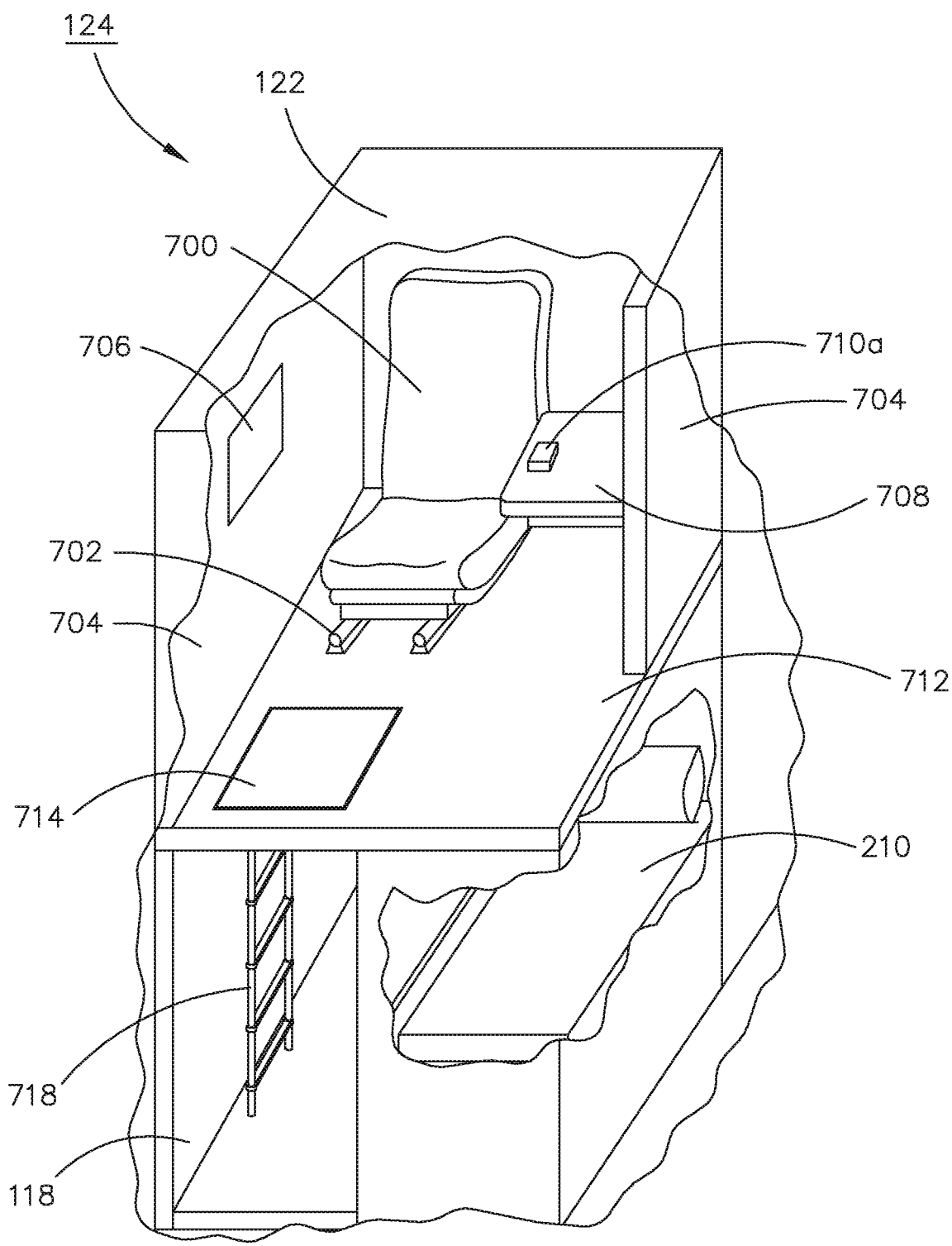
FIG. 7A is a perspective view of an exemplary embodiment of an aircraft suite including a main cabin compartment and a lower lobe rest compartment according to the inventive concepts disclosed herein.
Figure 7B:
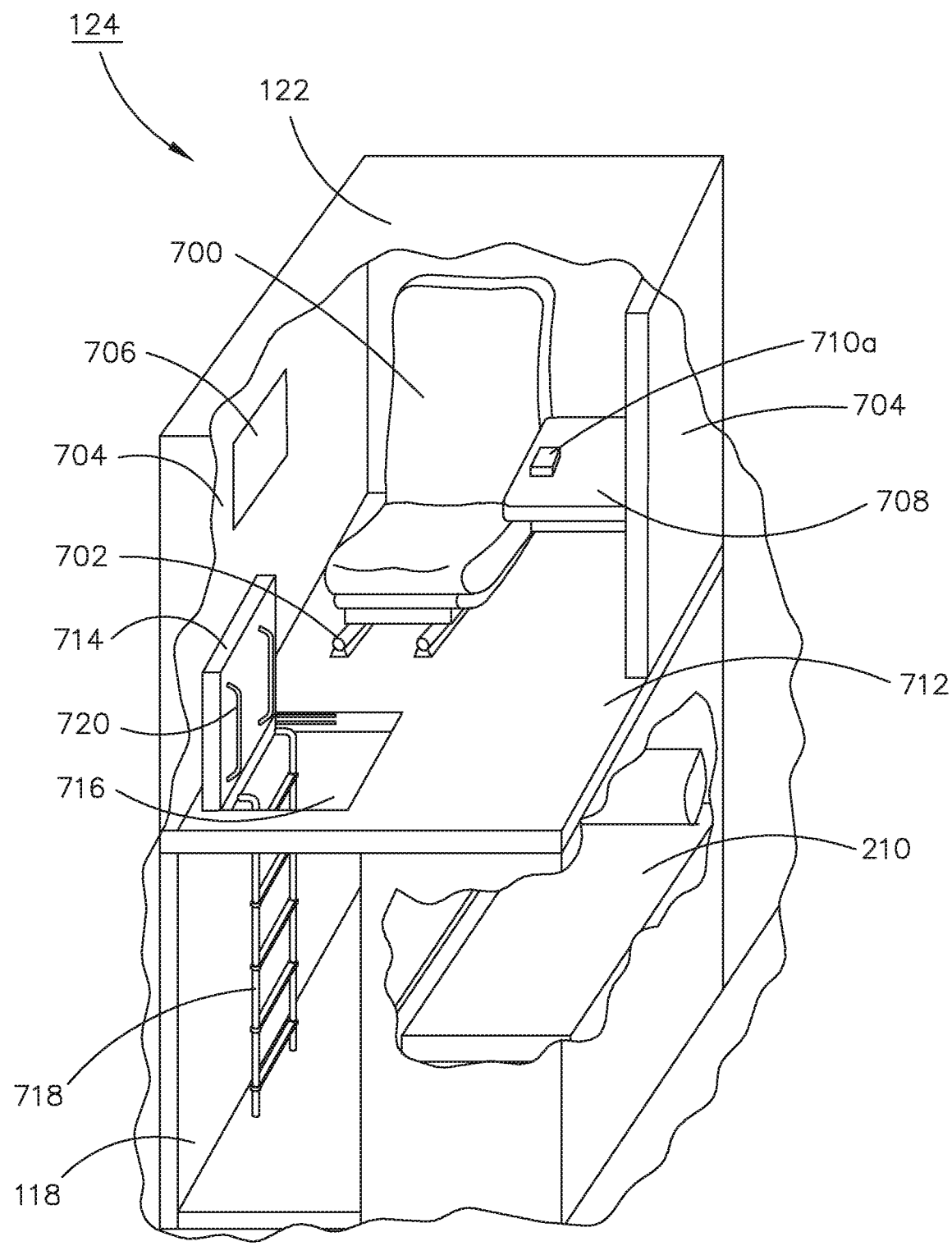
FIG. 7B is an exemplary embodiment of an aircraft suite including a main cabin compartment and a lower lobe rest compartment according to the inventive concepts disclosed herein.
Figure 7C:
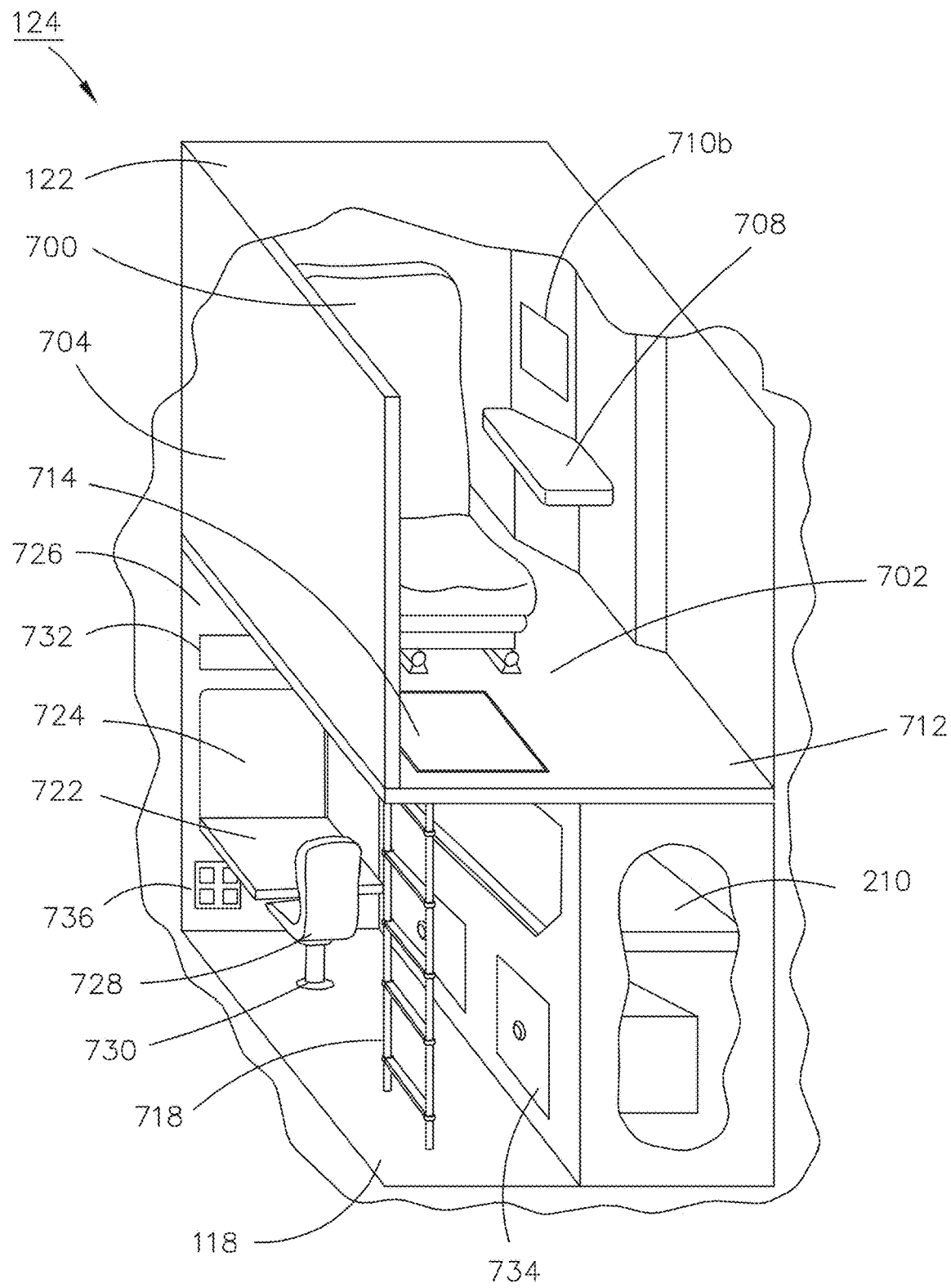
FIG. 7C is an exemplary embodiment of an aircraft suite including a main cabin compartment and a lower lobe rest compartment according to the inventive concepts disclosed herein.
Figure 7D:
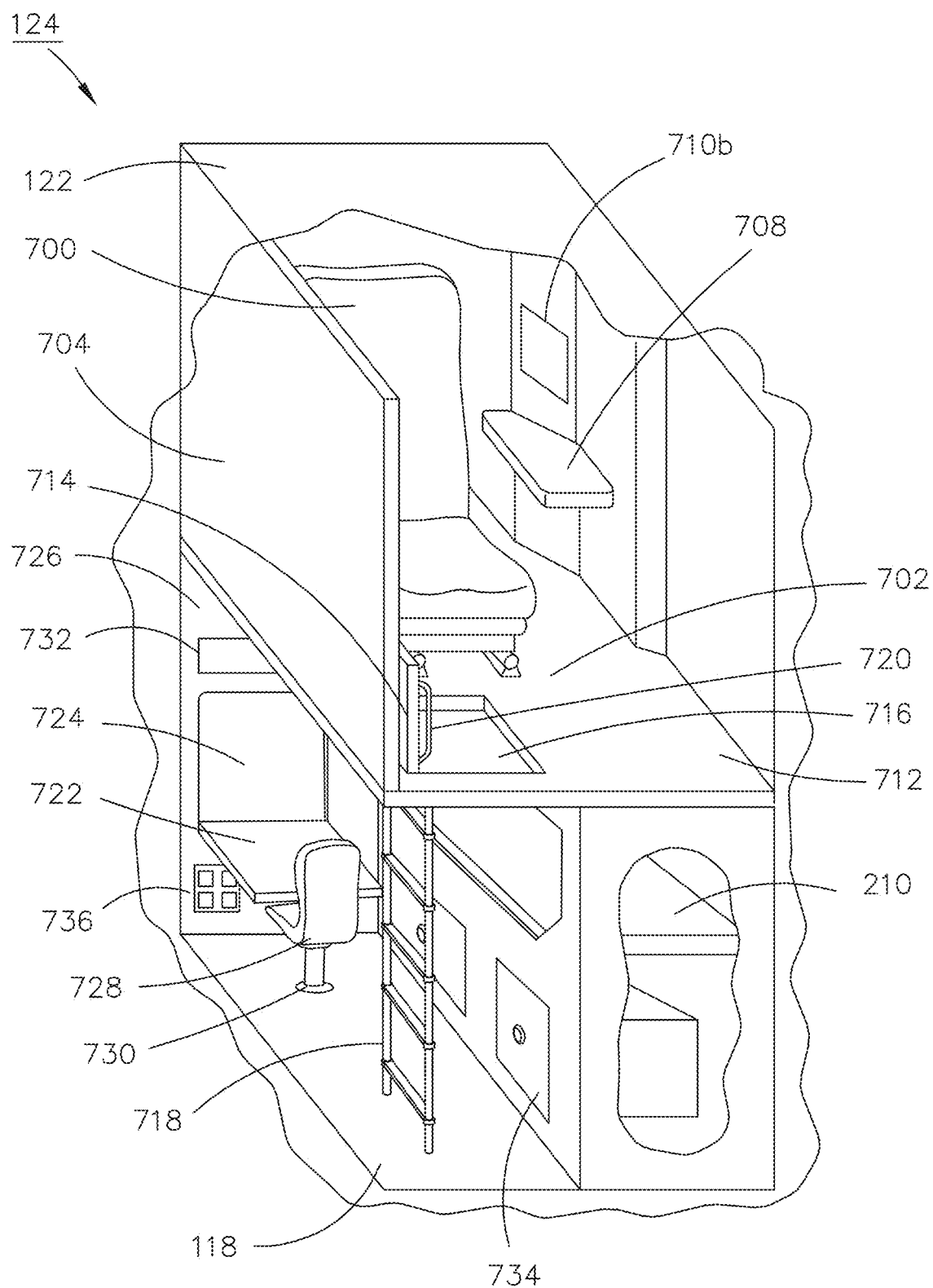
FIG. 7D is an exemplary embodiment of an aircraft suite including a main cabin compartment and a lower lobe rest compartment according to the inventive concepts disclosed herein.
Figure 7E:
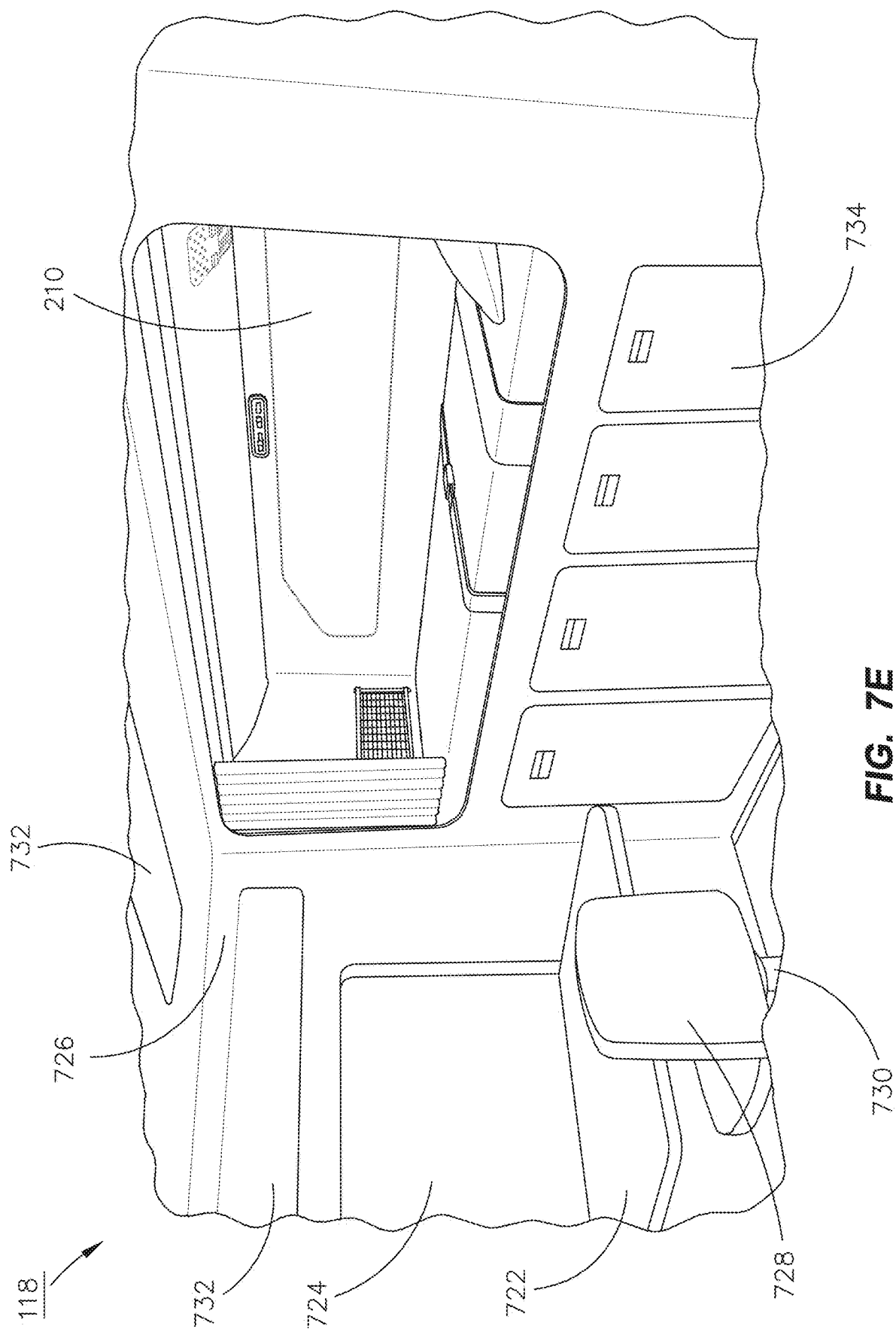
FIG. 7E is an exemplary embodiment of a lower lobe rest compartment for an aircraft suite according to the inventive concepts disclosed herein.

FIG. 6 illustrates a partial longitudinal view of an exemplary embodiment of the overhead passenger rest cabin 102 of the aircraft 100 according to the inventive concepts disclosed herein.

The one or more passenger rest compartments 210 of the overhead passenger rest cabin 102 may be sequentially arranged along either side of the central corridor 200 extending forward (e.g., substantially parallel to the longitudinal/roll axis of the aircraft 100 (e.g., as illustrated in FIGS. 1 and 2)). For example, the overhead passenger rest cabin 102 may include a set of passenger rest compartments 210, with a subset of compartments 210 on the port side of the central corridor 200 and an additional subset of opposite compartments 210 on the starboard side. For instance, the set of passenger rest compartments 210 may be evenly distributed between the subset of compartments 210 and the additional subset of compartments 210 (e.g., a set of twenty compartments 210 may be separated into a subset including ten compartments 210 and an additional subset including ten compartments 210). In addition, the set of passenger rest compartments 210 may not be evenly distributed between the subset of compartments 210 and the additional subset of compartments 210. It is noted herein that air and/or one or more components fabricated from a material including sound-dampening properties may be inserted between walls of adjacent passenger rest compartments 210. The one or more passenger rest compartments 210 may be modular.

The transitional space 204 (e.g., as illustrated in FIG. 2) between the entry vestibule 114 (e.g., as illustrated in FIGS. 1 and 2) and the overhead passenger rest cabin 102 may include one or more handles 600, which may be graspable by cabin crew or passengers entering the overhead passenger rest cabin 102 via the entry vestibule 114. One or more handles 602 may be spaced along the central corridor 200, where the one or more handles 602 may be graspable by cabin crew or passengers traversing the central corridor 200 (e.g., in the case of a passenger, after entering the overhead passenger rest cabin 102 via the entry vestibule 114 and proceeding to an assigned passenger rest compartment 210). The one or more handles 602 may be configured (e.g., positioned) to reduce strain while traversing the central corridor 200 in a crouched position. A crew station may be located at the forward end of the overhead passenger rest cabin 102 (including, e.g., emergency storage for first aid and fire containment supplies, communications facilities, and/or temporary jump seating). Similar crew stations may be located within the transitional space 204 (e.g., as illustrated in FIG. 2) at the aft end of the overhead passenger rest cabin 102 and throughout the lower lobe passenger rest cabin 104 (e.g., as illustrated in FIG. 5). For example, a crew station may be located proximate to the staircase or the point at which the entry vestibule 114 enters the lower lobe passenger rest cabin 104.

FIGS. 7A-10E generally illustrate exemplary embodiments of the aircraft suite 124 including the premium compartment 122 with the lower lobe rest compartment 118 of the aircraft 100 according to the inventive concepts disclosed herein.

FIGS. 7A-7E illustrate exemplary embodiments of the aircraft suite 124 including the premium compartment 122 with the lower lobe rest compartment 118 of the aircraft 100 according to the inventive concepts disclosed herein.

The premium compartment 122 may include an aircraft seat 700. For example, the aircraft seat 700 may be a lay-flat seat, a reclining seat, or the like. By way of another example, the aircraft seat 700 may be trackable and/or rotatable via a set of rails 702. It is noted herein, however, that the aircraft seat 700 may be fixed in orientation and/or position.

The premium compartment 122 may include one or more bulkheads 704. The one or more bulkheads 704 may include one or more devices 706. For example, the one or more devices 706 may include, but are not limited to, one or more windows in a bulkhead 704, one or more windows in the fuselage, lighting, one or more displays, or the like. The premium compartment 122 may include one or more tables 708 (e.g., trays). For example, the one or more tables 708 may be stowable (e.g., foldable into/out of a bulkhead, retractable into/pullable out of a bulkhead, or the like) or fixed on position (e.g., coupled in placed relative to a bulkhead). By way of another example, the one or more tables 708 may include one or more independently adjustable sections.

The premium compartment 122 may include one or more control devices. For example, the premium compartment 122 may include one or more control devices 710a coupled to and/or embedded within a table 708. By way of another example, the premium compartment 122 may include one or more control devices 710b coupled to and/or embedded within a bulkhead 704. By way of another example, the premium compartment 122 may include one or more remote control devices.

The premium compartment 122 may include a floor 712. The premium compartment 122 may include a hatch 714, where the hatch 714 provides entry into and/or egress from the lower lobe rest compartment 118. The hatch 714 may be inset within an opening 716 in the floor 712 and rotatable about an axis proximate to one end of the table 722 (e.g., about an axis through one or more pivot pins coupling an end of the hatch 714 to the opening 716) between a closed position (e.g., horizontal position) and an open position. For example, a top surface of the hatch 714 may be flush with a surface of the floor 712 when in the closed position. By way of another example, the top surface of the hatch 714 may protrude a selected height from the surface of the floor 712. For instance, a molding may surround the opening 716 and provide a transitional surface between the top surface of the hatch 714 and the top surface of the floor 712. It is noted herein the top surface of the hatch 714 may be coupled to the surface of the floor 712 via an external hinge instead of via the one or more pivot pins to the opening 716.

The hatch 714 may include one or more assist components (e.g., springs, pistons, latches, lockable linkage assemblies, notches or grooves, or the like). For example, the one or more assist components may be configured to assist the hatch 714 in rotating about the axis through the one or more pivot pins, hold the hatch 714 in the open position without an application of an external force, and/or hold the hatch 714 in a closed position without an application of an external force.

The lower lobe rest compartment 118 may include an ascent/descent device 718 accessible when the hatch 714 is in the open position. For example, the ascent/descent device 718 may include a ladder. For instance, the ladder may be fixed in place via a set of couplers on a floor of the lower lobe rest compartment 118, and via a set of couplers on a bulkhead and/or via a set of couplers on a deckhead (e.g., ceiling under the floor 712) of the lower lobe rest compartment 118. It is noted herein that the ladder may be extendable and/or retractable from the bulkhead or the deckhead of the lower lobe rest compartment 118, or from the hatch 714 when the hatch 714 is in the open position. By way of another example, the ascent/descent device 718 may include a set of steps coupled to and/or embedded within a bulkhead of the lower lobe rest compartment 118 and/or the cargo deck of the aircraft 100. By way of another example, the ascent/descent device 718 may include a vestibule 114.

It is noted herein that operation of the hatch 714 may be manual (e.g., by a force exerted by a passenger) and/or electric (e.g., by a force provided by one or more electric motors, where the one or more electric motors are controllable via the one or more control devices (e.g., the one or more control devices 710a, the one or more control devices 710b, the one or more remote control devices, or the like)).

The hatch 714 may include one or more hatch handles 720 coupled to a bottom surface of the hatch 714. For example, the one or more hatch handles 720 may be aligned with a central axis of the ascent/descent device 718 (e.g., a central axis of a hatch handle 720 may be aligned with a central axis of a ladder post of the ascent/descent device 718, as illustrated in FIG. 8C). By way of another example, the one or more hatch handles 720 may be unaligned (e.g., parallel but not aligned via central axis, or set at an angle (e.g., perpendicular) to the central axis of the hatch handle (e.g., parallel with a rung or step of the ascent/descent device 718)) with the central axis of the ascent/descent device 718. It is noted herein the one or more handles 720 may be extendable from the ascent/descent device 718 when the hatch 714 is in the open position, in addition to and/or instead of being coupled to the bottom surface of the hatch 714.

The lower lobe rest compartment 118 may include the passenger rest compartment 210. The lower lobe rest compartment 118 may include a table 722. The table 722 may be inset within a recess 724 in a bulkhead 726 and rotatable about an axis proximate to one end of the table 722 (e.g., about an axis through one or more pivot pins coupling an end of the table 722 to the recess 724) between a raised position (e.g., upright position) and a lowered position. For example, a front surface of the table 722 may be flush with a surface of the bulkhead 726 when in the raised position. By way of another example, the front surface of the table 722 may protrude a selected height from the surface of the floor 712. For instance, a molding may surround the opening 716 and provide a transitional surface between the top surface of the hatch 714 and the top surface of the floor 712. It is noted herein the front surface of the table 722 may be coupled to the surface of the bulkhead 726 via an external hinge instead of via the one or more pivot pins to the recess 724. In addition, it is noted herein that the table 722 may instead be fixed to a floor of the lower lobe rest compartment 118 at one or more contact points.

The table 722 may include one or more assist components (e.g., springs, pistons, latches, lockable linkage assemblies, notches or grooves, or the like). For example, the one or more assist components may be configured to assist the hatch table 722 in rotating about the axis through the one or more pivot pins, hold the table 722 in the raised position without an application of an external force, and/or hold the table 722 in the lowered position without an application of an external force.

The lower lobe rest compartment 118 may include a chair 728. For example, the chair 728 may be rotatable about a mount 730. For example, the mount 730 may include a center post 730 coupled to the floor of the lower lobe compartment 118, which may allow the chair 728 to be rotatable about an axis. By way of another example, the mount 730 may include a set of rails coupled to the floor of the lower lobe rest compartment 118, which may allow the chair 728 to be trackable in one or more directions and/or rotatable about an axis. It is noted herein, however, that the aircraft seat 700 may be fully fixed in position.

It is noted herein that one or more of the table 722, the recess 724, the chair 728, and the mount 730 may be considered a workspace, for purposes of the present disclosure.

The lower lobe rest compartment 118 may include lighting 732. The lower lobe rest compartment 118 may include a stowage compartment 734. For example, the stowage compartment 734 may be set underneath the passenger rest compartment 118. The lower lobe rest compartment 118 may include one or more outlets 736. The lower lobe rest compartment 118 may include one or more control devices.

The premium compartment 122 and/or the lower lobe rest compartment 118 may include a partially or fully modular structure. For example, the entire premium compartment 122 may be insertable into and/or removable from the main passenger cabin 106 of the aircraft 100 as a modular unit. By way of another example, the entire lower lobe rest compartment 118 may be insertable into and/or removable from the cargo deck of the aircraft 100 as a modular unit. By way of another example, the passenger rest compartment 210 may be insertable into and/or removable from the lower lobe rest compartment 118 as a single unit. In this regard, the premium compartment 122, the lower lobe rest compartment 118, and/or the passenger rest compartment 210 may be implemented as any number of units (e.g., double, triple, quadruple, or the like). In this regard, the total number of premium compartments 122, lower lobe rest compartments 118, and/or passenger rest compartments 210 may be scaled up or down as needed.

Figure 8A:
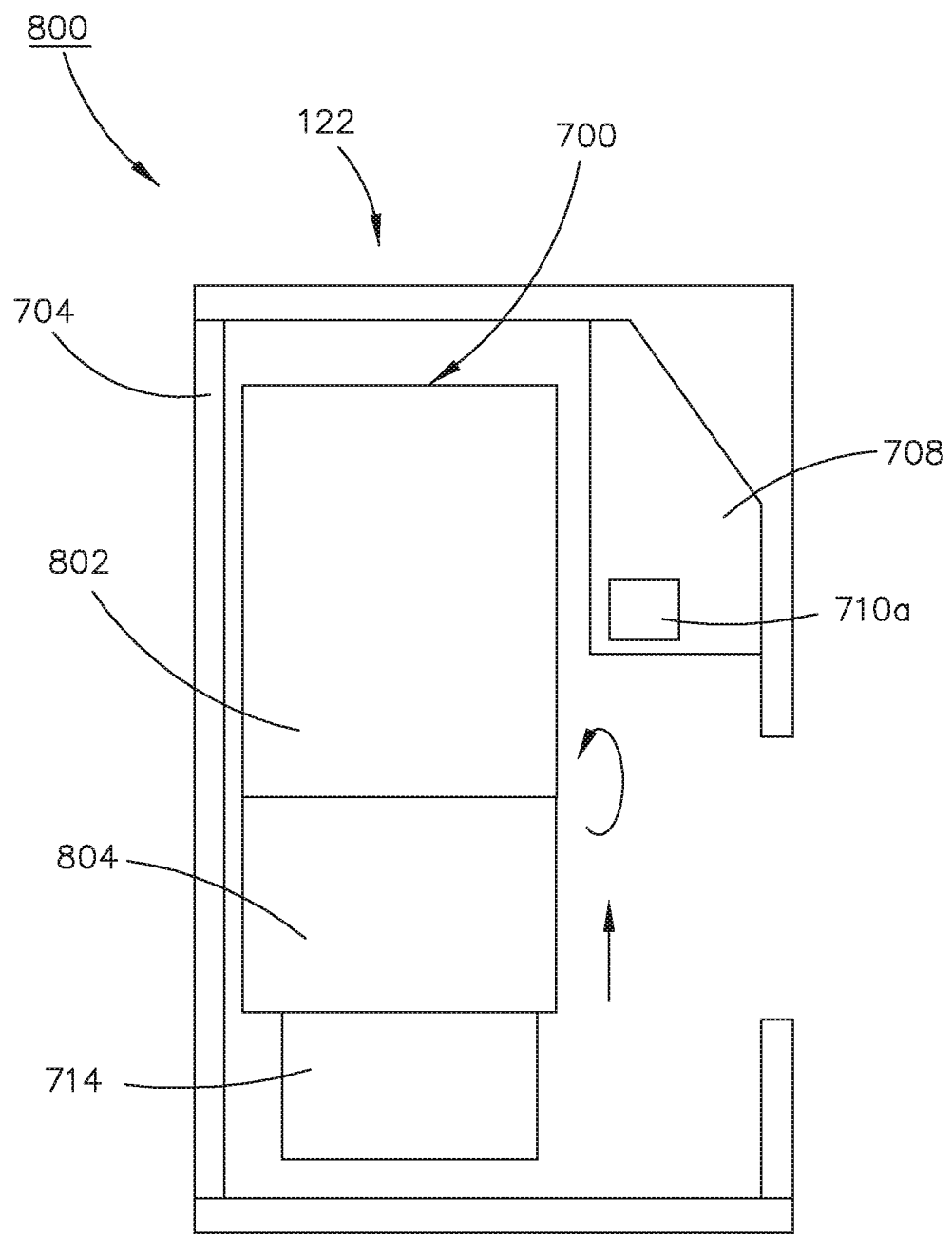
FIG. 8A is a top view of an exemplary embodiment of an aircraft suite including a main cabin compartment and a lower lobe rest compartment according to the inventive concepts disclosed herein.
Figure 8B:
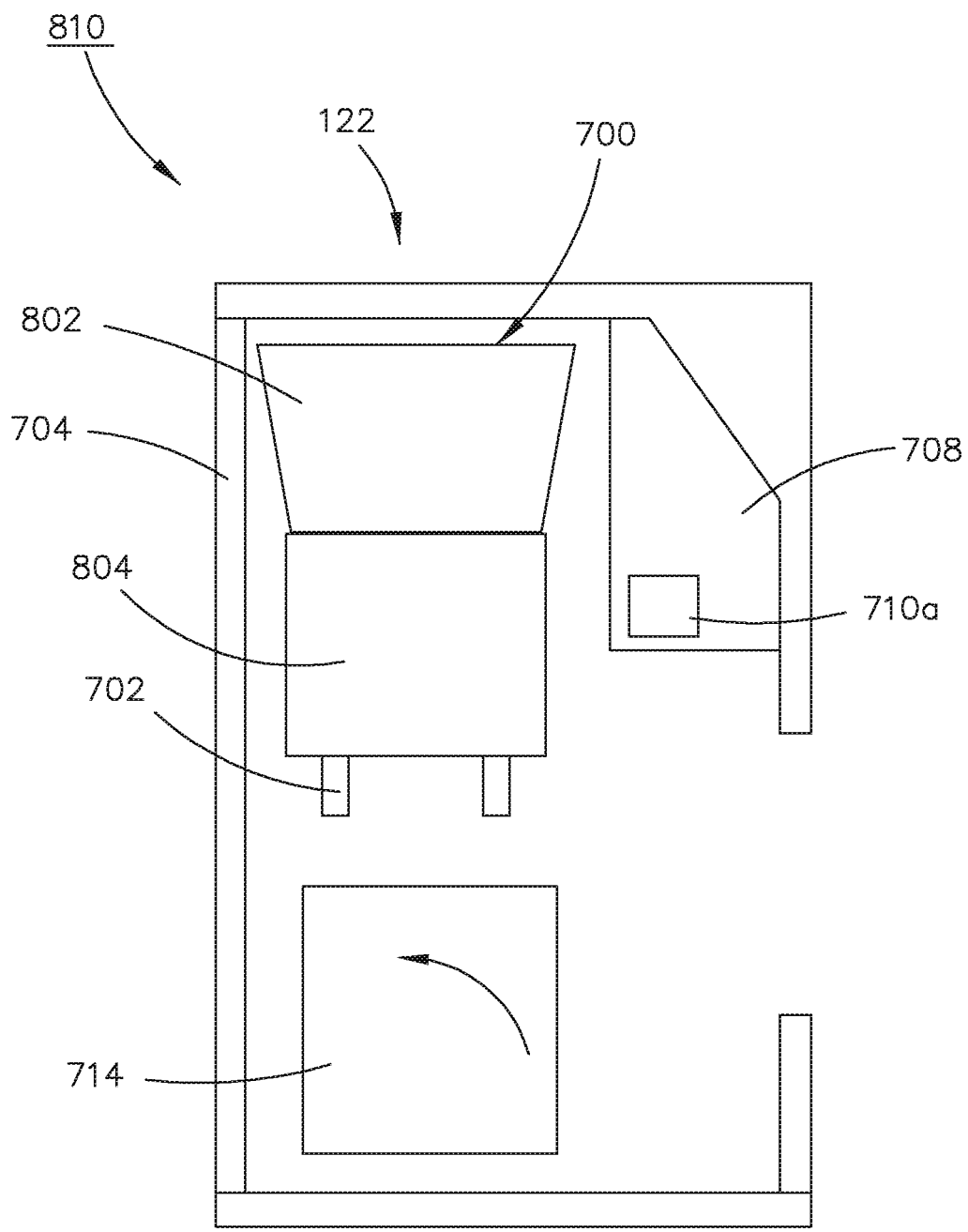
FIG. 8B is a top view of an exemplary embodiment of an aircraft suite including a main cabin compartment and a lower lobe rest compartment according to the inventive concepts disclosed herein.
Figure 8C:
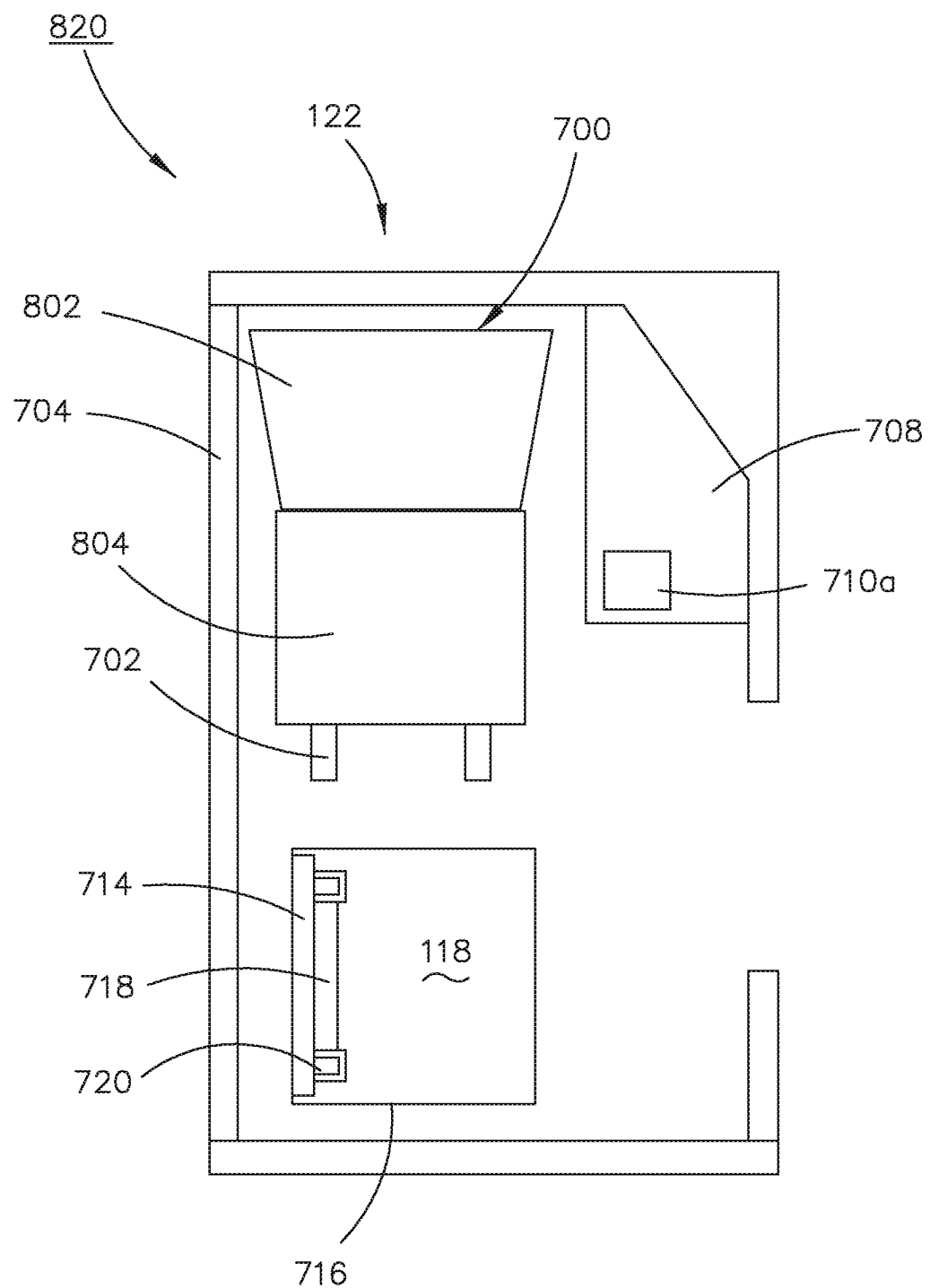
FIG. 8C is a top view of an exemplary embodiment of an aircraft suite including a main cabin compartment and a lower lobe rest compartment according to the inventive concepts disclosed herein.

FIGS. 8A-8C illustrate a top view of exemplary embodiments of the aircraft suite 124 including the premium compartment 122 and the lower lobe rest compartments 118 of the aircraft 100 in one or more operational states according to the inventive concepts disclosed herein.

FIG. 8A illustrates an operational state 800 where the aircraft seat 700 is in a lay-flat position. In the lay-flat position, a seat back 802 and a seat cushion 804 form a flat surface on which a passenger may lay. In the lay-flat position, at least a portion of the seat back 802 and/or the seat cushion 804 may conceal at least a portion of the hatch 714, such that the hatch 714 may be prevented from opening (e.g., rotating about the axis through the one or more pivot pins between the closed position and the open position). The aircraft seat 700 may move into a reclined position or an upright position via adjustment of the seat back 802 and/or the seat cushion 804. For example, the seat back 802 and the seat cushion 804 may rotate upright and the aircraft seat 700 may translate (e.g., track) into the reclined position or the upright position. For instance, the seat back 802 and the seat cushion 804 may simultaneously rotate upright and translate into the reclined position or the upright position. In addition, the seat back 802 and the seat cushion 804 may rotate upright, and then translate into the reclined position or the upright position. It is noted herein that the aircraft seat 700 may not enter the lay-flat position when the hatch 714 is in the open position.

FIG. 8B illustrates an operational state 810 where the aircraft seat 700 is in the upright position or the reclined position. While the aircraft seat 700 is in the upright position or the reclined position, the hatch 714 may be rotated between the closed position to the open position.

FIG. 8C illustrates an operational state 820 where the aircraft seat 700 is in the upright position or the reclined position and the hatch 714 is in the open position. While the aircraft seat 700 is in the upright position or the reclined position and the hatch 714 is in the open position, the lower lobe rest compartment 118 may be accessible via the opening 716 and the ascent/descent device 718.

It is noted herein that operation of the aircraft seat 700 and/or the hatch 714 may be manual (e.g., by a force exerted by a passenger) and/or electric (e.g., by a force provided by one or more electric motors, where the one or more electric motors are controllable via the one or more control devices (e.g., the one or more control devices 710a, the one or more control devices 710b, the one or more remote control devices, or the like)).

Figure 9A:
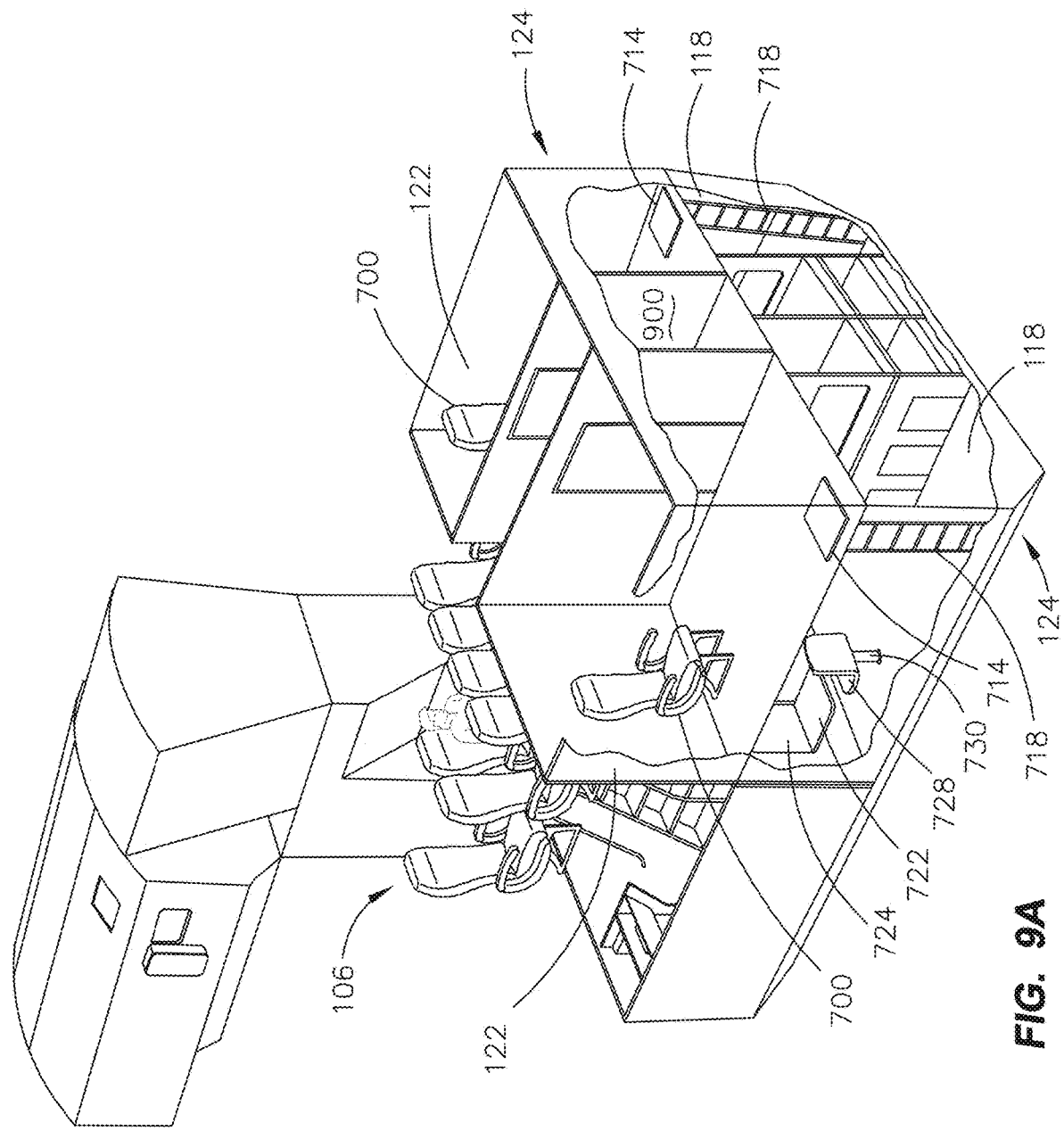
FIG. 9A is an isometric view of an exemplary embodiment of an aircraft including an aircraft suite with a main cabin compartment and a lower lobe rest compartment according to the inventive concepts disclosed herein.
Figure 10A:
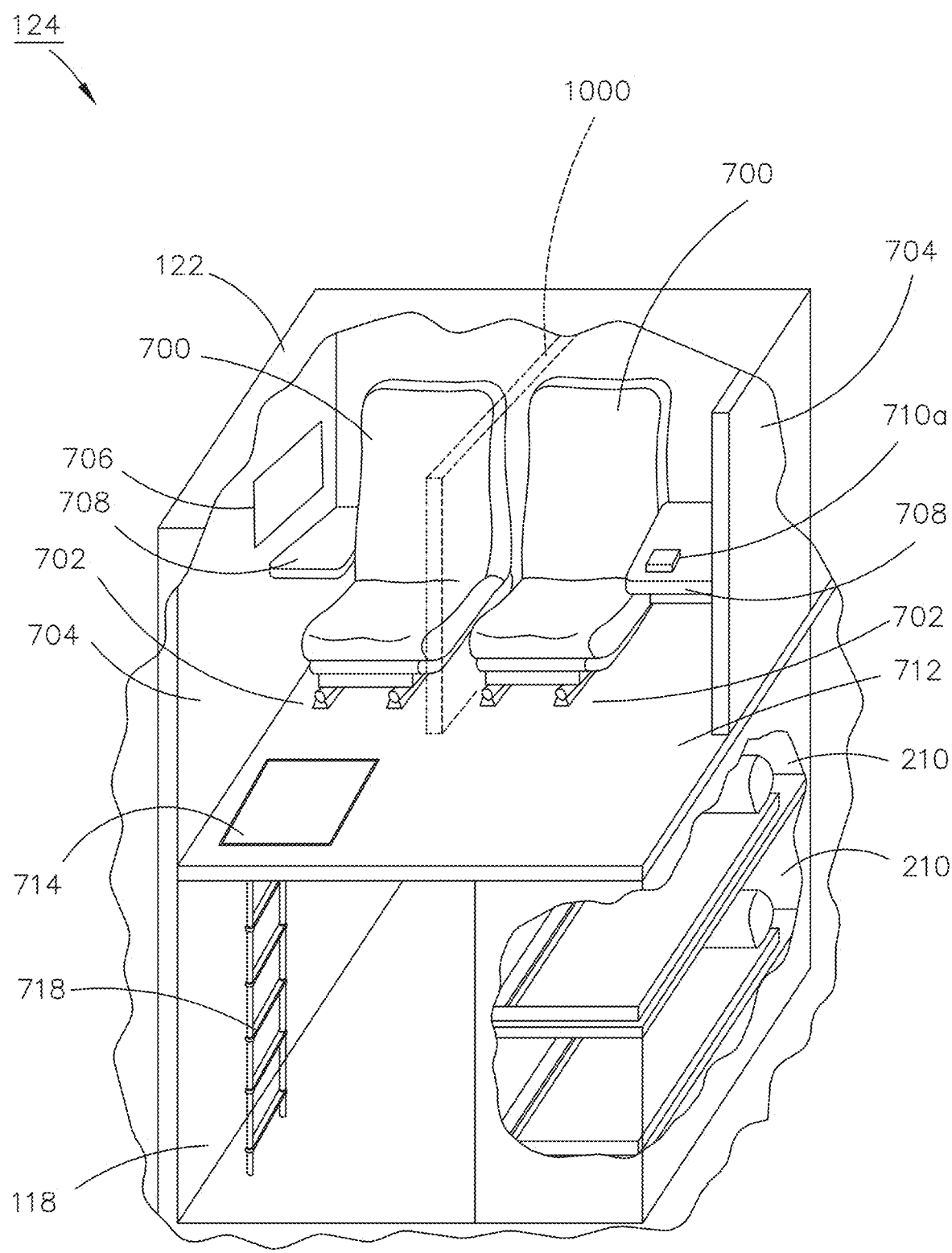
FIG. 10A is an exemplary embodiment of an aircraft suite including a main cabin compartment and a lower lobe rest compartment according to the inventive concepts disclosed herein.
Figure 10B:
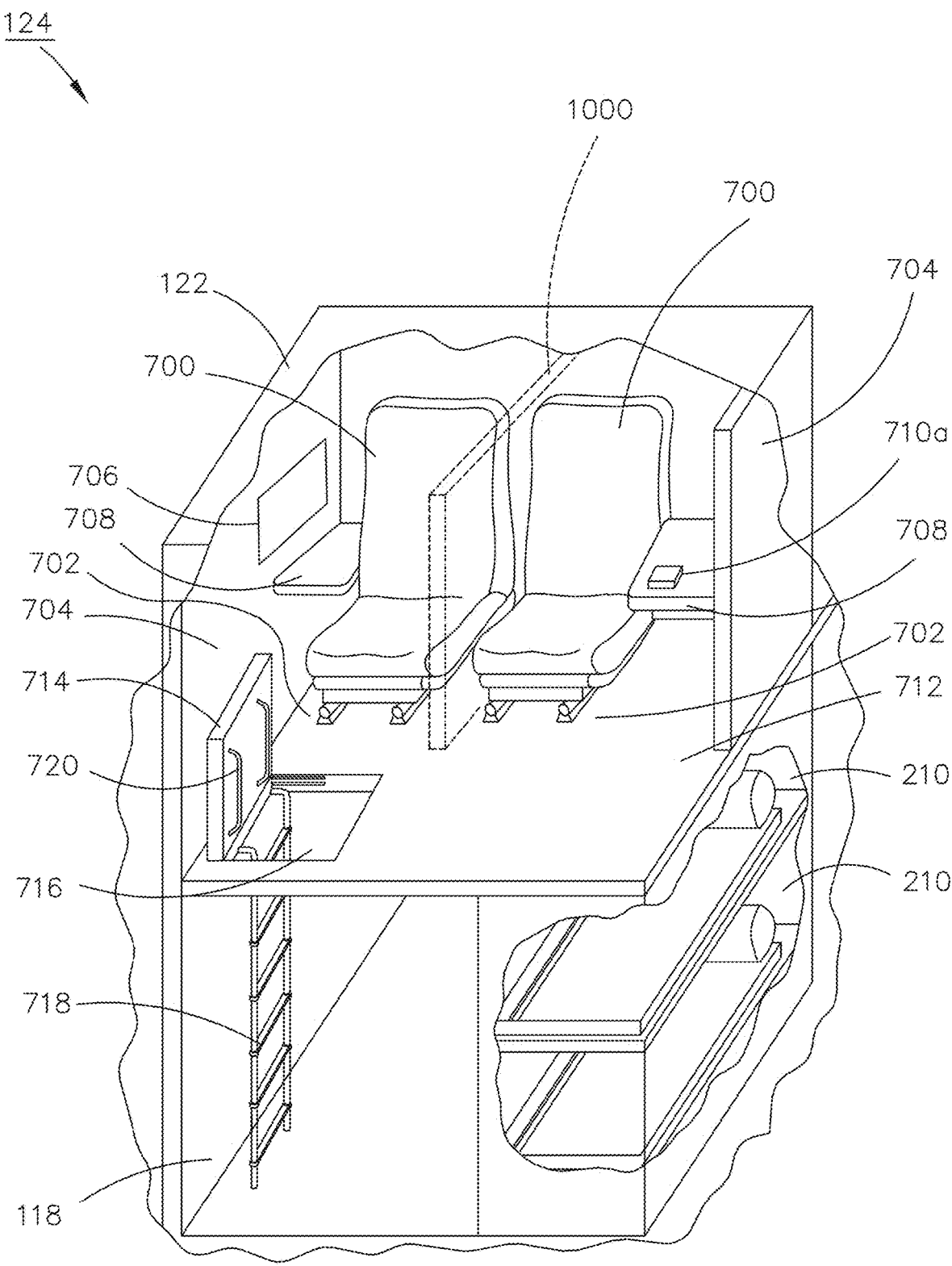
FIG. 10B is an exemplary embodiment of an aircraft suite including a main cabin compartment and a lower lobe rest compartment according to the inventive concepts disclosed herein.
Figure 10C:
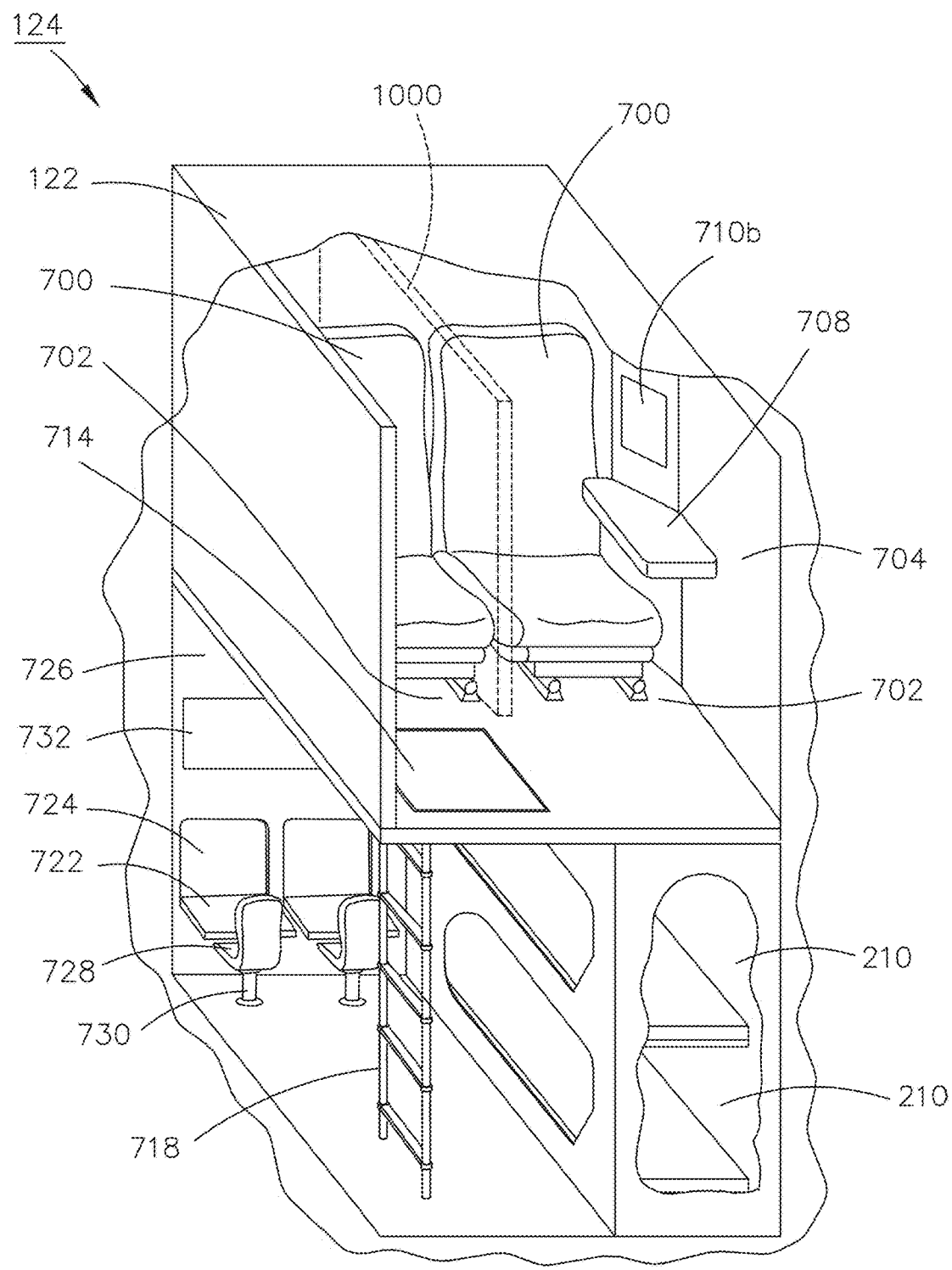
FIG. 10C is an exemplary embodiment of an aircraft suite including a main cabin compartment and a lower lobe rest compartment according to the inventive concepts disclosed herein.
Figure 10D:
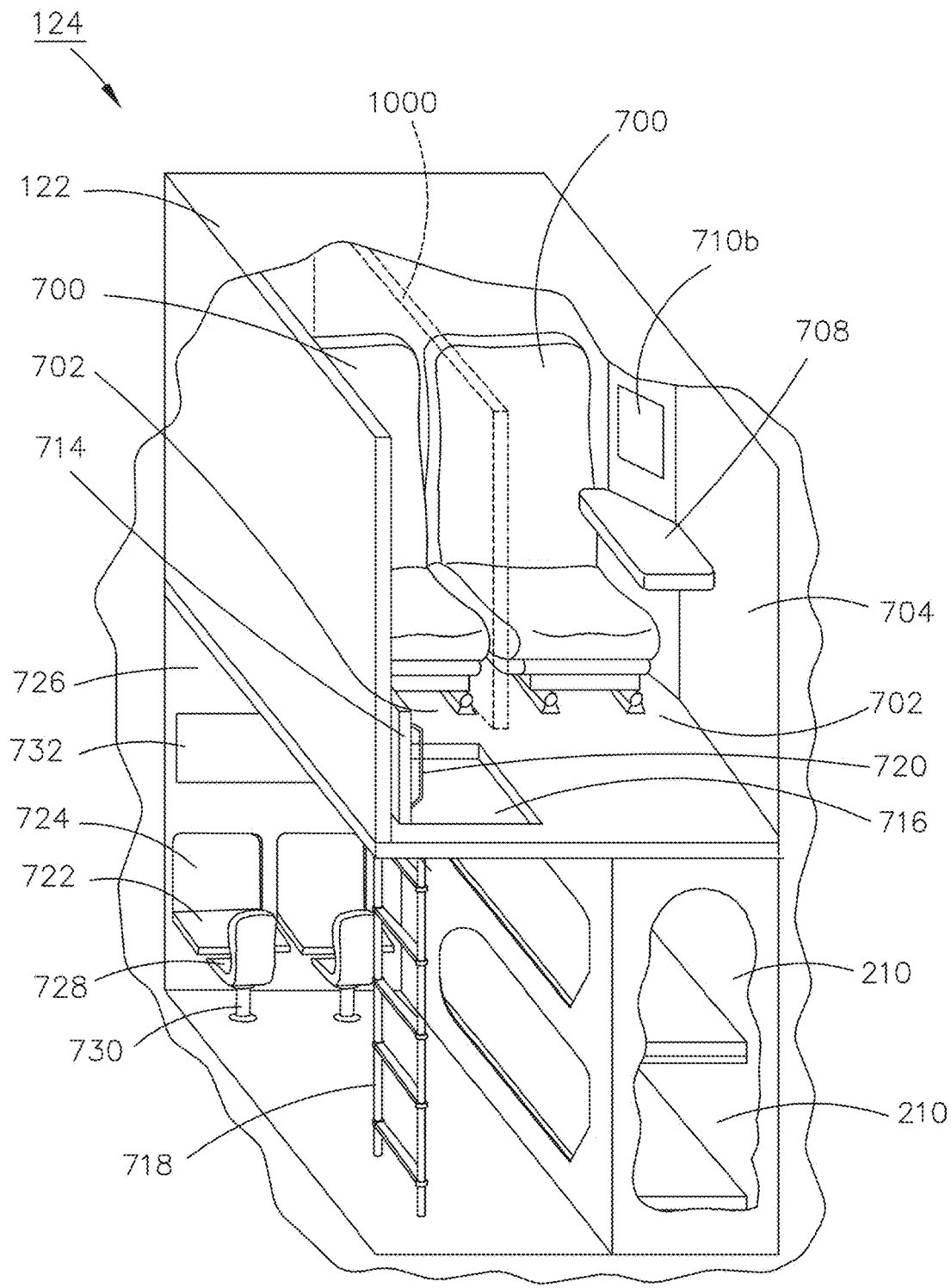
FIG. 10D is an exemplary embodiment of an aircraft suite including a main cabin compartment and a lower lobe rest compartment according to the inventive concepts disclosed herein.
Figure 10E:
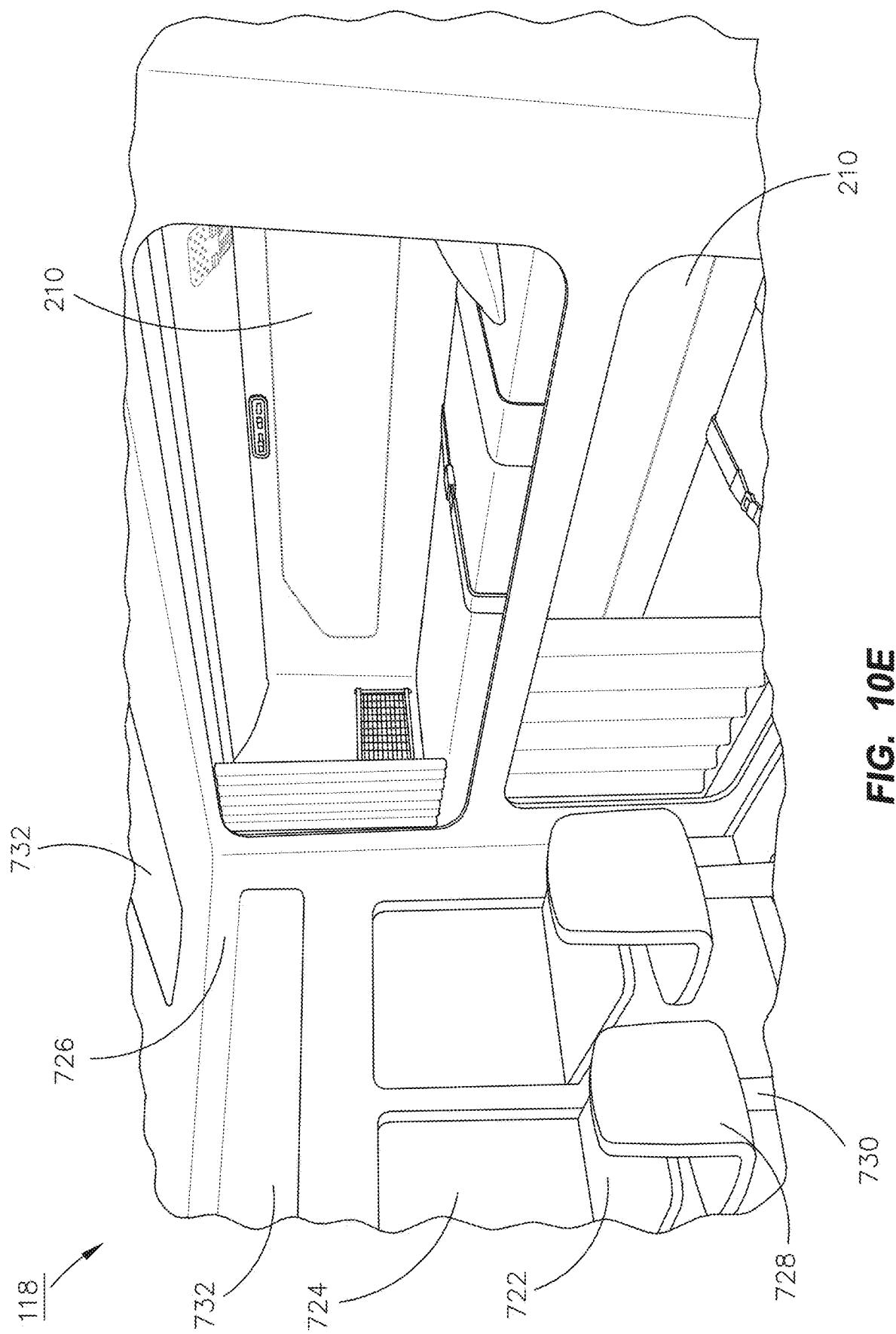
FIG. 10E is an exemplary embodiment of a lower lobe rest compartment for an aircraft suite according to the inventive concepts disclosed herein.

FIGS. 9A and 9B illustrate perspective views of exemplary embodiments of aircraft suites 124 including the premium compartment 122 and the lower lobe rest compartments 118 of the aircraft 100 according to the inventive concepts disclosed herein.

The main passenger cabin 106 may include (or be adjacent to an area including) multiple premium suites 124 (e.g., multiple aircraft suites 124), where each premium suite 124 (e.g., aircraft suite 124) includes a premium compartment 122 and a lower lobe rest compartment 118. For example, the main passenger cabin 106 may include one or more pairs of premium suites 124 proximate to and accessible via an access corridor 900. For instance, a pair of premium suites 124 may be mirror images in construction (e.g., the hatch 714 is positioned proximate to an outboard bulkhead of the premium compartment 122 and/or the fuselage of the aircraft 100 in each premium suite 124). In addition, the pair of suites 124 may be the same in construction (e.g., the hatch 714 is positioned proximate to an outboard bulkhead of the premium compartment 122 and/or the fuselage of the aircraft 100 in a premium suite 124, while the hatch 714 is positioned proximate to an inboard bulkhead of the premium compartment 122 and/or the access corridor 900 bulkhead in a second premium suite 124). It is noted herein, however, that the hatch 714 (and the opening 716) may be positioned anywhere within the floor 712 of the premium compartment 122.

The lower lobe rest compartment 118 may be configured to conform to a sloped surface 902 of a bulkhead of the lower lobe rest compartment 118 and/or the cargo deck of the aircraft 100. In this regard, the ascent/descent device 718 may not be vertically-positioned (e.g., perpendicular) to the floor or the ceiling of the lower lobe rest compartment 118, but instead may be set an angle to the floor or the ceiling of the lower lobe rest compartment 118. It is noted herein, however, that where the ascent/descent device includes a set of steps coupled to and/or embedded within a bulkhead of the lower lobe rest compartment 118, the slope may be accounted for in the natural offset in the distance between each adjacent step of the set of steps.

Although the suites 124 are illustrated as being substantially parallel to the longitudinal or roll axis of the aircraft 100, it is noted herein the suites 124 may be aligned at an angle to the roll axis (e.g., perpendicular to the roll axis or substantially parallel to the pitch axis of the aircraft 100). Therefore, the above description should not be interpreted as a limitation on the present disclosure but merely an illustration.

FIGS. 10A-10E are example embodiments of exemplary embodiments of the aircraft suite 124 including the premium compartment 122 and the lower lobe rest compartment 118 of the aircraft 100 according to the inventive concepts disclosed herein.

The premium compartment 122 may include multiple (e.g., two or more) aircraft seats 700. The multiple aircraft seats 700 may be partitioned (e.g., separated) by one or more bulkheads 1000. For example, the one or more bulkheads 1000 may be fixed in position. By way of another example, the one or more bulkheads 1000 may be collapsible. For instance, the one or more bulkheads 1000 may include a screen that unfolds/unrolls from and/or retracts into a housing on a bulkhead 704 (e.g., the bulkhead 704 behind the aircraft seats 700) or the floor 712 (e.g., a floor area between the aircraft seats 700) of the premium compartment 122. It is noted herein, however, that the multiple aircraft seats 700 may not be separated by the one or more bulkheads 1000 (e.g., may be separated by air, or may be in contact (e.g., may be able to form a continuous surface when in the lay-flat position), or the like).

The premium compartment 122 may include a single hatch 714 that provides the passengers occupying the premium compartment 122 access to the lower lobe rest compartment 118. It is noted herein, however, the premium compartment 122 may include a hatch 714 for each passenger occupying the premium compartment 122 access to the lower lobe rest compartment 118.

The lower lobe rest compartment 118 may include a passenger rest compartment 210 for each passenger of the premium compartment 122. For example, the passenger rest compartments 210 may be stacked in the lower lobe rest compartment 118. It is noted herein, however, that the lower lobe rest compartment 118 may include a passenger rest compartment 210 that is shared by some or all passengers of the premium compartment 122.

The lower lobe rest compartment 118 may include a table 722 and a chair 728 for each passenger of the premium compartment 122. It is noted herein, however, that the lower lobe rest compartment 118 may include a table 722 and/or a chair 728 that is shared by some or all passengers of the premium compartment 122.

Although the present disclosure is directed to a suite 124 including a lower lobe rest compartment 118 being coupled to a premium compartment 122 via a hatch 714, it is noted herein the suite 124 may include a lower lobe rest compartment 118 coupled to an area including a partitioned premium seat 120. As such, as description directed to the premium compartment 122 may be extended to the area including the partitioned premium seat 120. Therefore, the above description should not be interpreted as a limitation on the present disclosure but merely an illustration.

It is noted herein that the lower lobe passenger rest cabins 104 and/or the lower lobe rest compartments 118 may be dimensioned to match the proportions of a cargo compartment and palletized or otherwise compatible with existing onboard cargo facilities (e.g., for installation to, or removal from, the aircraft 100).

As will be appreciated from the above embodiments, the inventive concepts disclosed herein are directed to a lower lobe passenger space in a cargo area of an aircraft, the lower lobe passenger space accessible via a hatch, the lower lobe passenger space including one or more of an alternative seating area or a bunk area for a passenger.

As used throughout, "at least one" means one or a plurality of; for example, "at least one" may include one, two, three, . . . , one hundred, or more. Similarly, as used throughout, "one or more" means one or a plurality of; for example, "one or more" may include one, two, three, . . . , one hundred, or more. Further, as used throughout, "zero or more" means zero, one, or a plurality of; for example, "zero or more" may include zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An aircraft suite, comprising:
   a passenger compartment disposed on a main deck of an aircraft, the passenger compartment partitioned from a main passenger cabin of the main deck by at least one bulkhead, the passenger compartment comprising:
   an aircraft seat; and
   a hatch set within an opening in a floor of the passenger compartment; and
   a lower lobe rest compartment integrated in a cargo deck below the main deck, the lower lobe rest compartment proximate to the passenger compartment, the lower lobe rest compartment comprising:
   a passenger rest compartment; and
   a device proximate to the hatch, the device configured to assist a passenger to at least one of:
   descend into the lower lobe rest compartment from the passenger compartment via the hatch; or
   ascend into the passenger compartment from the lower lobe rest compartment via the hatch.

2. The aircraft suite in claim 1, the aircraft seat capable of accommodating a passenger in an upright position, a reclined position, and a lay-flat position.

3. The aircraft suite in claim 2, the hatch rotatable when the aircraft seat is in the upright position or the reclined position.

4. The aircraft suite in claim 2, at least a portion of the hatch concealed by the aircraft seat when the aircraft seat is in the lay-flat position.

5. The aircraft suite in claim 1, the lower lobe rest compartment further comprising a workspace, the workspace comprising a table and a chair.

6. The aircraft suite in claim 1, the passenger rest compartment comprising one or more displays.

7. The aircraft suite in claim 6, the one or more displays comprising one or more virtual windows.

8. The aircraft suite in claim 1, the passenger compartment further comprising an additional aircraft seat, the lower lobe rest compartment comprising an additional passenger rest compartment.

9. An aircraft suite, comprising:
   a passenger compartment disposed on a main deck of an aircraft, the passenger compartment partitioned from a main passenger cabin of the main deck by at least one bulkhead, the passenger compartment comprising:
   a first aircraft seat and an additional aircraft seat; and
   a hatch set within an opening in a floor of the passenger compartment; and
   a lower lobe rest compartment integrated in a cargo deck below the main deck, the lower lobe rest compartment proximate to the passenger compartment, the lower lobe rest compartment comprising:
   a first passenger rest compartment and an additional passenger rest compartment; and
   a device proximate to the hatch, the device configured to assist one or more of a first passenger or an additional passenger to at least one of:
   descend into the lower lobe rest compartment from the passenger compartment via the hatch; or
   ascend into the passenger compartment from the lower lobe rest compartment via the hatch.

10. The aircraft suite in claim 9, the lower lobe rest compartment further comprising a first workspace and an additional workspace, each of the first workspace and the additional workspace comprising a table and a chair.

11. The aircraft suite in claim 9, the first aircraft seat and the additional aircraft seat partitioned by at least one bulkhead.

* * * * *